United States Patent
Murata et al.

(10) Patent No.: US 12,248,147 B2
(45) Date of Patent: Mar. 11, 2025

(54) INFORMATION PROCESSING DEVICE AND INFORMATION PROCESSING METHOD

(71) Applicant: SONY GROUP CORPORATION, Tokyo (JP)

(72) Inventors: Karen Murata, Tokyo (JP); Honoka Ozaki, Tokyo (JP); Ichiro Mori, Tokyo (JP); Kentaro Ida, Tokyo (JP)

(73) Assignee: SONY GROUP CORPORATIN, Tokyo (JP)

( * ) Notice: Subject to any disclaimer, the term of this patent is extended or adjusted under 35 U.S.C. 154(b) by 0 days.

(21) Appl. No.: 18/551,347

(22) PCT Filed: Jan. 18, 2022

(86) PCT No.: PCT/JP2022/001533
§ 371 (c)(1),
(2) Date: Sep. 19, 2023

(87) PCT Pub. No.: WO2022/209159
PCT Pub. Date: Oct. 6, 2022

(65) Prior Publication Data
US 2024/0168288 A1 May 23, 2024

(30) Foreign Application Priority Data
Mar. 30, 2021 (JP) .................... 2021-058563

(51) Int. Cl.
*G06F 3/01* (2006.01)
*G02B 27/01* (2006.01)
*G06T 7/50* (2017.01)

(52) U.S. Cl.
CPC ..... *G02B 27/0101* (2013.01); *G02B 27/0179* (2013.01); *G06F 3/013* (2013.01);
(Continued)

(58) Field of Classification Search
None
See application file for complete search history.

(56) References Cited

U.S. PATENT DOCUMENTS

| | | | | |
|---|---|---|---|---|
| 2011/0075257 A1* | 3/2011 | Hua | ............... | G02B 27/0172 359/464 |
| 2013/0286047 A1* | 10/2013 | Katano | ............... | G06T 11/00 348/333.01 |

FOREIGN PATENT DOCUMENTS

| | | | |
|---|---|---|---|
| JP | 2013-228557 A | 11/2013 | |
| JP | 6745518 B1 | 8/2020 | |

(Continued)

OTHER PUBLICATIONS

International Search Report and Written Opinion of PCT Application No. PCT/JP2022/001533, issued on Apr. 19, 2022, 10 pages of ISRWO.

*Primary Examiner* — Brian M Butcher
(74) *Attorney, Agent, or Firm* — CHIP LAW GROUP

(57) ABSTRACT

Provided is an information processing device that includes a gaze point calculation unit, a depth calculation unit, a display generation unit, and a drive calculation unit. The gaze point calculation unit calculates a gaze point on a virtual image reflected on a half mirror. The depth calculation unit generates depth information related to a depth of the gaze point. The display generation unit generates a display object to be superimposed on the virtual image. The drive calculation unit drives a superimposition optical system of the display object so as to allow the display object to be observed as an image having a depth corresponding to the depth information.

19 Claims, 16 Drawing Sheets

(52) U.S. Cl.
CPC .......... *G06T 7/50* (2017.01); *G02B 2027/014* (2013.01); *G02B 2027/0187* (2013.01)

(56) References Cited

FOREIGN PATENT DOCUMENTS

| | | |
|---|---|---|
| WO | 2019/001745 A1 | 1/2019 |
| WO | 2020/184317 A1 | 9/2020 |

* cited by examiner

FIG.6
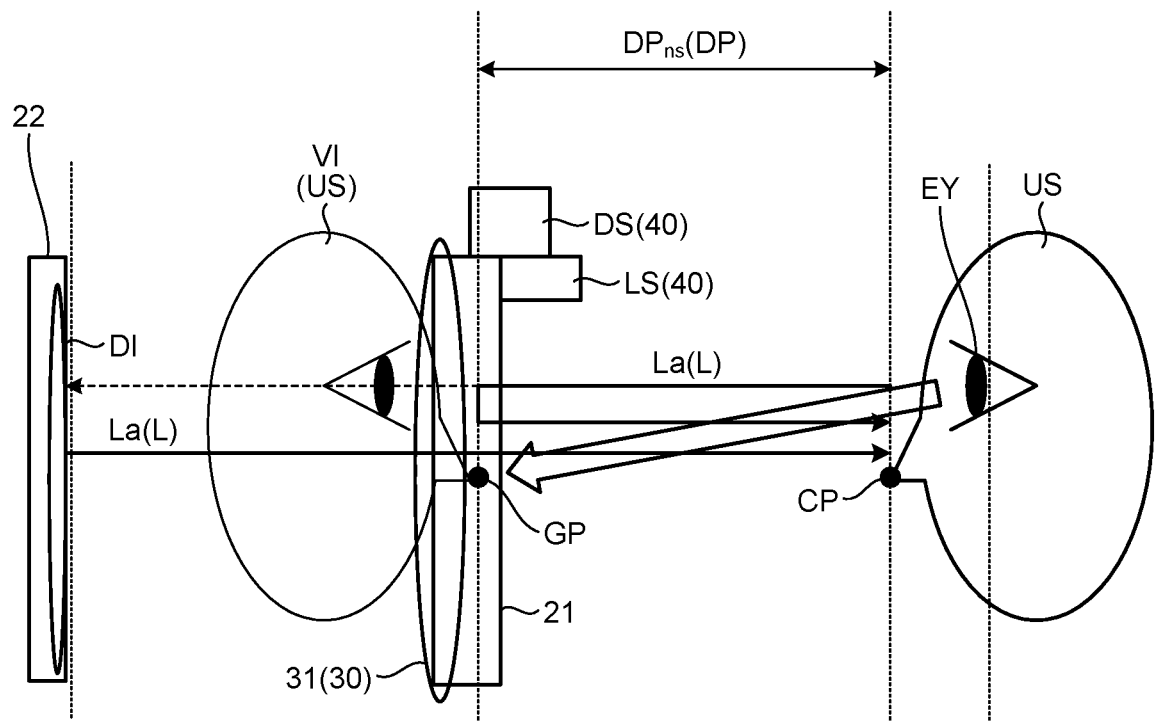
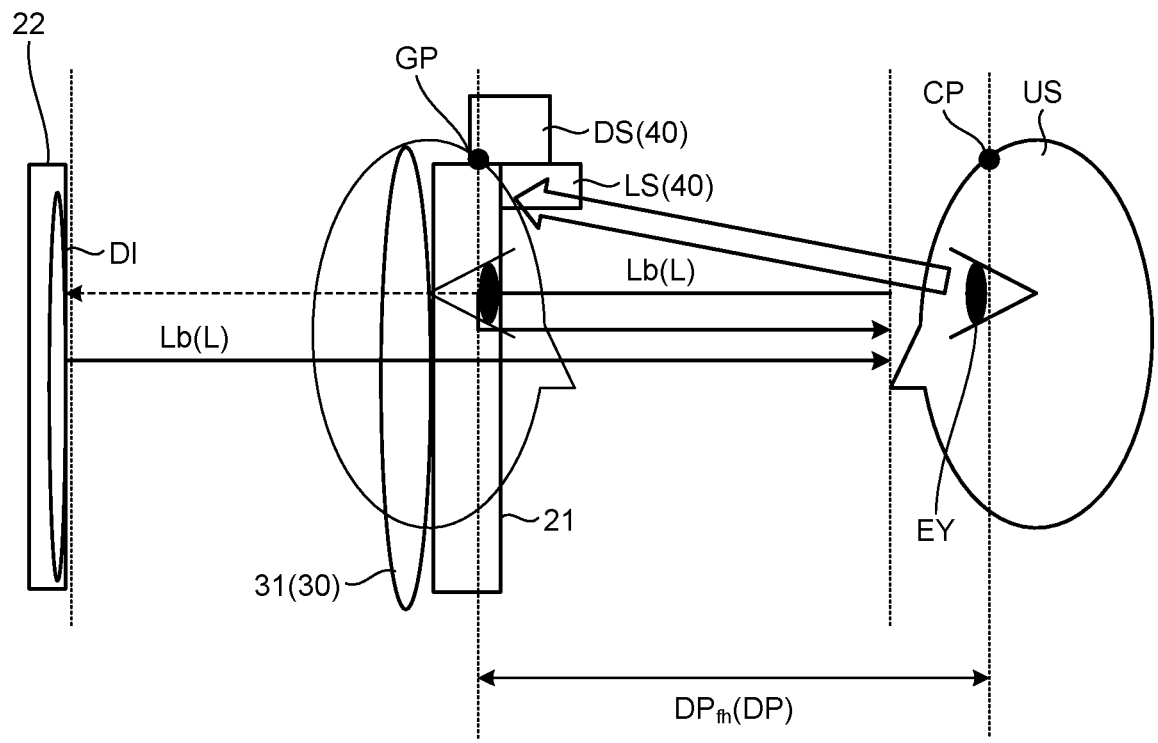

FIG.11

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2022/001533 filed on Jan. 18, 2022, which claims priority benefit of Japanese Patent Application No. JP 2021-058563 filed in the Japan Patent Office on Mar. 30, 2021. Each of the above-referenced applications is hereby incorporated herein by reference in its entirety.

FIELD

The present invention relates to an information processing device, an information processing method, and a program.

BACKGROUND

There is a proposed technique of superimposing a display object (virtual object), which is digital information, on a real object using a display and a half mirror. This type of display system is known as a smart mirror.

CITATION LIST

Patent Literature

Patent Literature 1: JP 2013-228557 A

SUMMARY

Technical Problem

The above-described display system includes a diffusion layer behind the half mirror to present the display object. Therefore, there is a problem that the real object and the display object are observed as virtual images having mutually different depths. With a depth difference between the real object and the display object, the user's eyes cannot simultaneously focus on the real object and the display object. Therefore, in an attempt to simultaneously observe the display object while gazing at the real object, the display object is viewed as a blurred image.

Patent Literature 1 proposes to dispose a lens capable of adjusting an optical path between the display and the half mirror. However, the position of the lens is controlled based on a distance between the real object (user facing the half mirror) and the half mirror. Therefore, the position in focus in the depth direction is restricted to one position corresponding to the distance of the real object. This makes it difficult to present display objects in focus at positions having different depths, such as an eye and a nose, even within an identical real object.

In view of this, the present disclosure proposes an information processing device, an information processing method, and a program capable of easily adjusting a position in a depth direction at which a display object is presented.

Solution to Problem

According to the present disclosure, an information processing device is provided that comprises: a gaze point calculation unit that calculates a gaze point on a virtual image reflected on a half mirror; a depth calculation unit that generates depth information related to a depth of the gaze point; a display generation unit that generates a display object to be superimposed on the virtual image; and a drive calculation unit that drives a superimposition optical system of the display object so as to allow the display object to be observed as an image having a depth according to the depth information. According to the present disclosure, an information processing method in which an information process of the information processing device is executed by a computer, and a program causing a computer to execute the information process of the information processing device, are provided.

BRIEF DESCRIPTION OF DRAWINGS

FIG. 6 is a diagram illustrating an adjustment example of a superimposition optical system according to a change in a gaze point.

FIG. 11 is a diagram illustrating an example of an optical element implemented by a phase adjustment element.

DESCRIPTION OF EMBODIMENTS

Embodiments of the present disclosure will be described below in detail with reference to the drawings. In each of the following embodiments, the same parts are denoted by the same reference symbols, and a repetitive description thereof will be omitted.

Note that the description will be given in the following order.

[1. Overview]
[2. Configuration of display system]
[3. Information processing method]
[4. Control of presentation position of display object]
[4-1. Variations of superimposition optical system]
[4-2. Adjustment of magnification of display object]
[4-3. Processing in case of failure in gaze line detection]
[4-4. Calibration]
[5. Detection timing of depth information]
[6. Generation range of distance information]
[7. Processing when gaze line deviates from gaze target region]
[8. Application example]
[8-1. Makeup work]
[8-2. Digital signage]
[8-3. In-vehicle rearview mirror]
[9. Effects]

1. Overview

Figure 1:
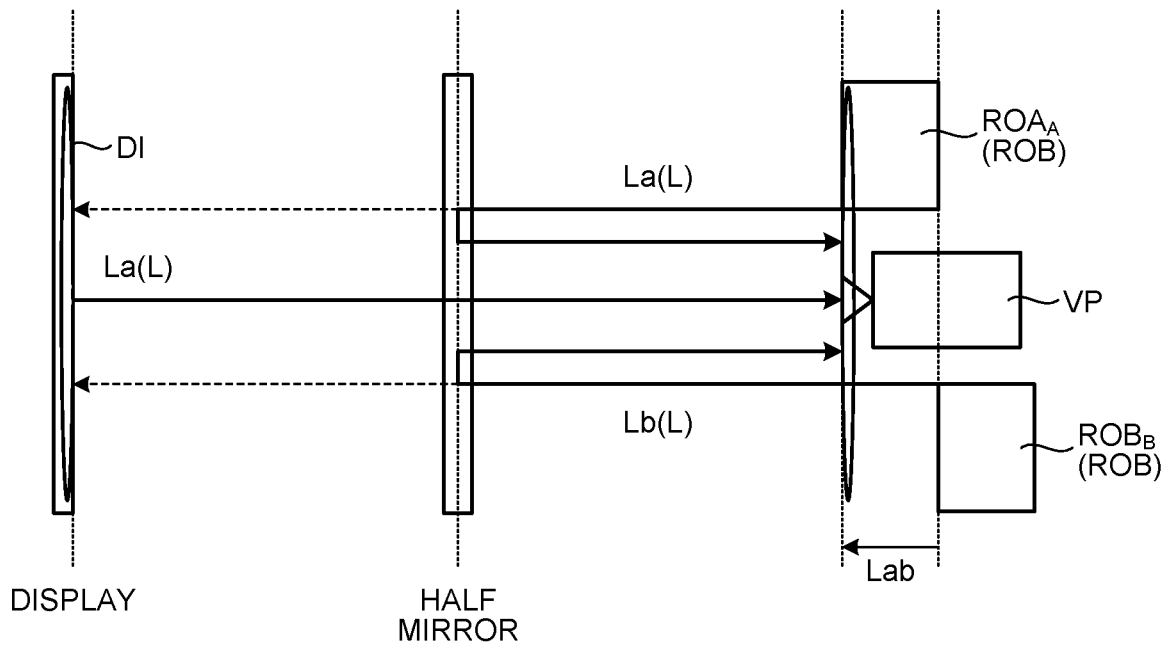
FIG. 1 is a diagram illustrating a background of the invention.

FIG. 1 is a diagram illustrating a background of the invention.

An assumed device here is a device similar to a typical smart mirror having a configuration of components disposed in order of a display, a half mirror, and a real object ROB. A virtual image of the real object ROB and a virtual image of a display object DI are reflected on the half mirror. A user observes the virtual images of the real object ROB and the display object DI reflected on the half mirror from a viewpoint VP being a fixed viewpoint. In order to focus on both the virtual image of the display object DI and the virtual image of the real object ROB, there is a need to equalize the distances between the display and the half mirror and between the half mirror and the real object ROB.

Here is an assumable case in which the display object DI is superimposed on each of a plurality of real objects ROB (specifically, a first real object $ROB_A$ and a second real object $ROB_B$) having different distances (optical path lengths L) to the half mirror. Compared to the position of the second real object $ROB_B$, the position of the first real object $ROB_A$ is closer to the half mirror by a distance Lab. Therefore, an optical path length La from the first real object $ROB_A$ to the viewpoint VP is shorter than an optical path length Lb from the second real object $ROB_B$ to the viewpoint VP by the distance Lab.

In this case, in order to bring both the real object ROB and the display object DI into focus, the distance between the display and the half mirror needs to be variable. However, in products such as typical smart mirrors, the distance between the display and the half mirror is fixed. Although there have been suggestions of products with variable distance, there is an issue that, when the real object ROB is a person, a depth equivalent to a moving range of the person would be required between the display and the half mirror. This would enlarge the device, making it difficult to apply the device to general household products such as a cosmetic table.

It is also possible to use a method as in Patent Literature 1 in which a lens capable of adjusting an optical path is disposed between the display and the half mirror to artificially vary the distance between the display and the half mirror while maintaining constant physical positions. However, in the method of Patent Literature 1, the position of the lens is controlled based on the distance between the real object ROB and the half mirror. Therefore, the position in focus in the depth direction is restricted to one position corresponding to the distance of the real object ROB. In order to superimpose a plurality of real objects ROB having mutually different depths in one screen, it would be necessary to locate a plurality of lenses in the screen and adjust the depth of the display object DI for each real object ROB. This case also has an issue of enlargement of the device.

In addition, for example, in a case where finely and continuously varying irregularities exist in one real object ROB like a human face, it is difficult to superimpose the display object DI at various positions in the real object ROB. Furthermore, since the optical system is adjusted only based on the distance between the half mirror and the real object ROB, the gaze line direction may be directed to the external area of the angle of view of the display depending on the angle at which the user looks into the screen, leading to the possibility that the display object DI becomes invisible.

Figure 5:
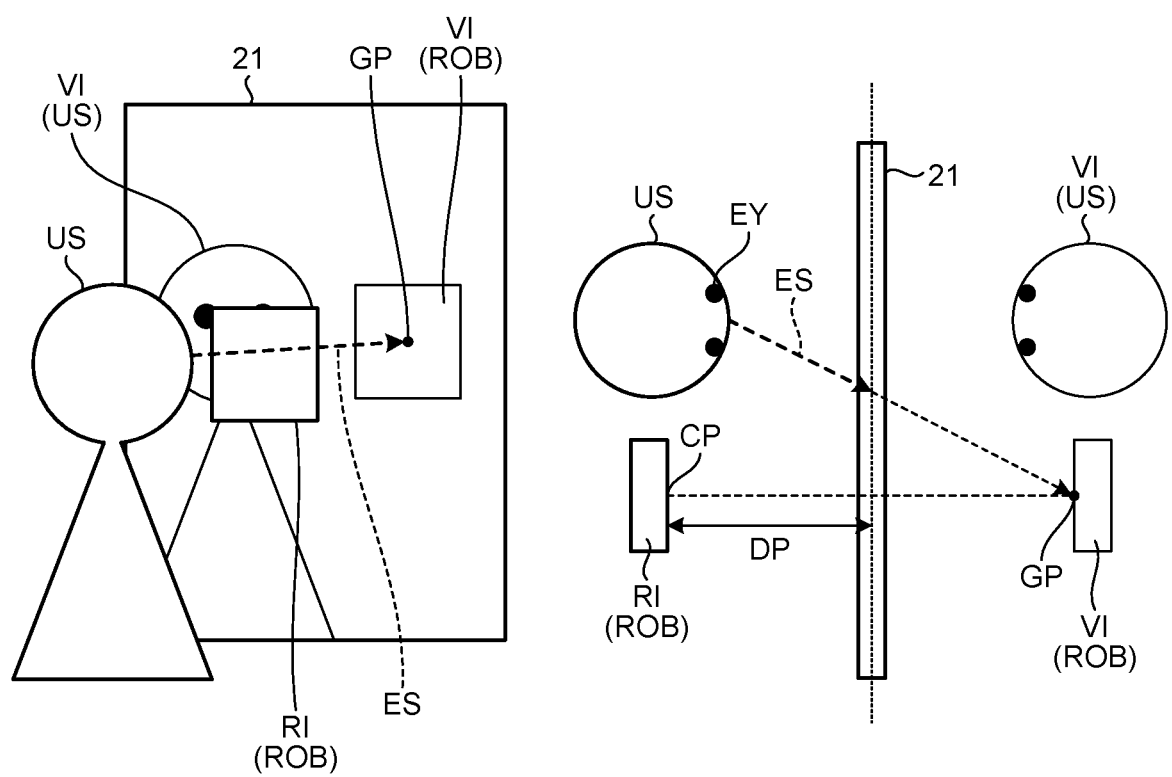
FIG. 5 is a diagram illustrating a relationship between a virtual image and a gaze point.

In view of these, the present disclosure proposes a method of detecting a gaze point GP on a virtual image VI, being a point gazed by a user US, and presenting the display object DI at a position in the depth direction corresponding to the gaze point GP (refer to FIG. 5). With the depth of the display object DI adjusted based on the gaze point GP of the user US, the display object DI is less likely to blur even in observation of the display object DI while gazing at the gaze point GP. Hereinafter, the display system of the present disclosure will be described in detail.

2. Configuration of Display System

Figure 2:
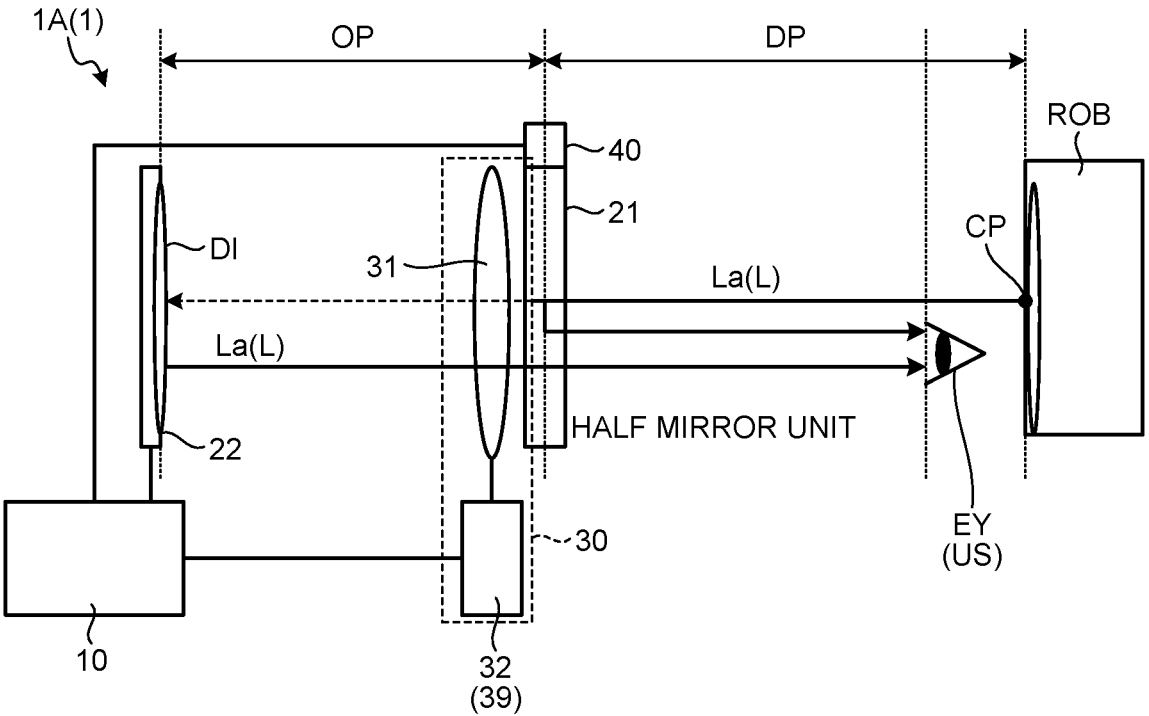
FIG. 2 is a diagram illustrating an example of a display system.
Figure 3:
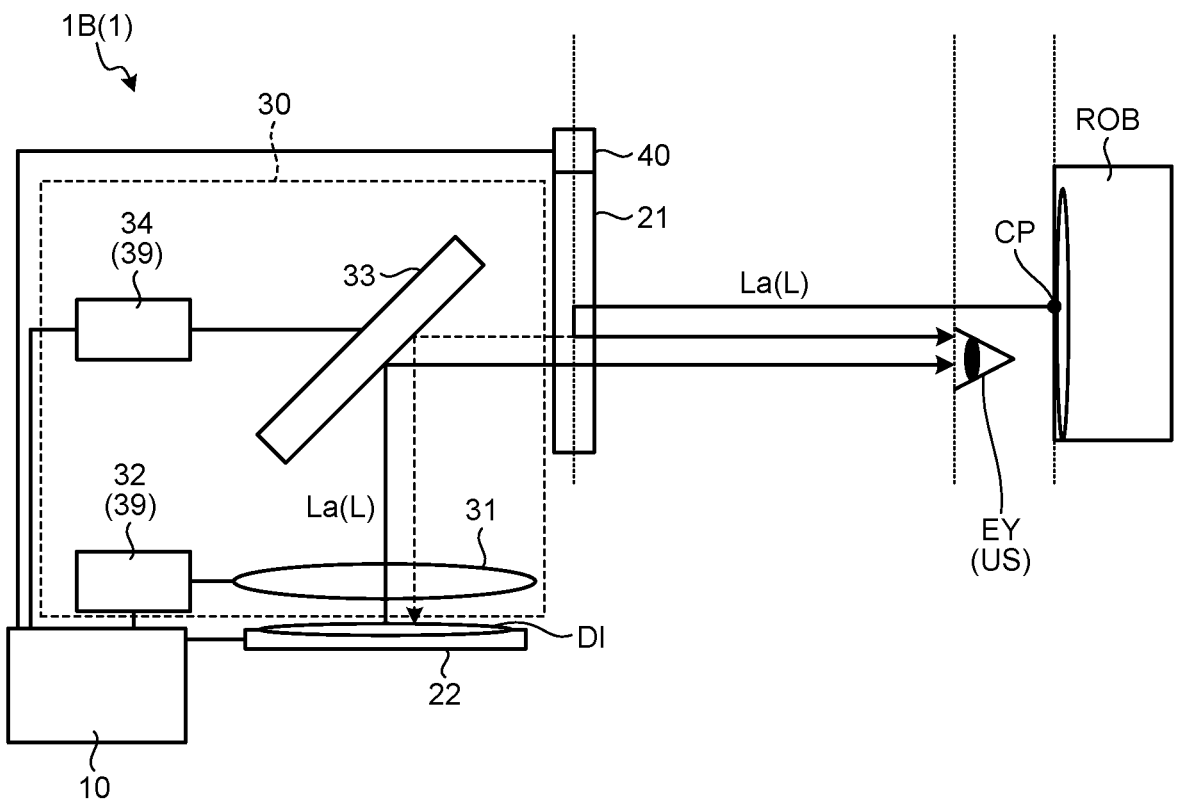
FIG. 3 is a diagram illustrating a modification of the display system.
Figure 4:
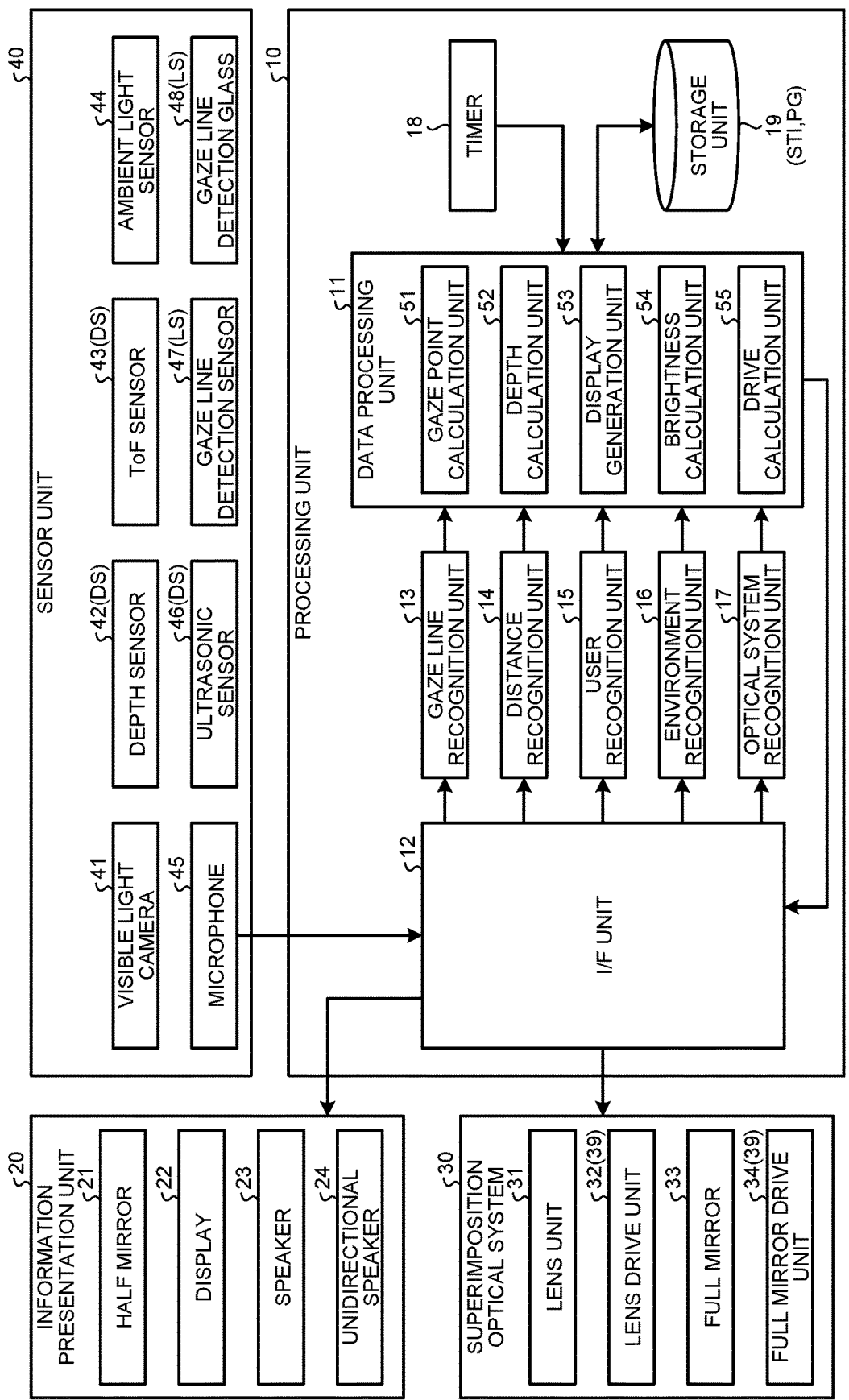
FIG. 4 is a diagram illustrating a functional configuration of the display system.

FIG. 2 is a diagram illustrating an example of a display system 1. FIG. 3 is a diagram illustrating a modification of the display system 1. FIG. 4 is a diagram illustrating a functional configuration of the display system 1. FIG. 5 is a diagram illustrating a relationship between the virtual image VI and the gaze point GP.

The display system 1 includes a processing unit 10, an information presentation unit 20, a superimposition optical system 30, and a sensor unit 40. The processing unit 10 is an information processing device that processes various types of information. The processing unit 10 controls the information presentation unit 20 and the superimposition optical system 30 based on sensor information acquired from the sensor unit 40.

The sensor unit 40 includes a plurality of sensors for sensing an external area. Examples of the plurality of sensors include a visible light camera 41, a depth sensor 42, a time of flight (ToF) sensor 43, an ambient light sensor 44, a microphone 45, an ultrasonic sensor 46, a gaze line detection sensor 47, and a gaze line detection glass 48.

The visible light camera 41 captures a visible light image of a space (external area) existing external to a half mirror 21. The depth sensor 42, the ToF sensor 43, and the ultrasonic sensor 46 function as a distance measuring sensor DS. The distance measuring sensor DS detects the distance of the real object ROB existing in the external area. The ambient light sensor 44 detects brightness of the external area. The microphone 45 detects an external sound.

The gaze line detection sensor 47 and the gaze line detection glass 48 function as gaze line sensors LS. The gaze line sensor LS detects a gaze line ES of the user US directed to the half mirror 21 using a known eye tracking technique. The gaze line detection sensor 47 is mounted on the display system 1. The gaze line detection glasses 48 are mounted on eyeglasses worn by the user US. For example, the gaze line detection sensor 47 and the gaze line detection glass 48 are selectively used according to the required accuracy of gaze line detection.

The information presentation unit 20 presents video information and audio information to the user US. The information presentation unit 20 includes, for example, a half mirror 21, a display 22, a speaker 23, and a unidirectional speaker 24.

The half mirror 21 reflects light from the external area and presents the virtual image VI of the real object ROB existing in the external area. The half mirror 21 performs superimposition display of the display object DI displayed on the display 22 on the virtual image VI of the real object ROB. The display 22 is implemented by using a known display such as a liquid crystal display (LCD) or an organic light emitting diode (OLED). The speaker 23 and the unidirectional speaker 24 are implemented by using Known speakers capable of outputting sound and the like.

The superimposition optical system 30 is disposed between the half mirror 21 and the display 22. The superimposition optical system 30 projects the display object DI displayed on the display 22 onto the half mirror 21. The superimposition optical system 30 includes a lens unit 31, a lens drive unit 32, a full mirror 33, and a full mirror drive unit 34, for example.

The lens unit 31 includes one or more lenses whose positions, focal lengths, and the like are adjustable by the lens drive unit 32. The full mirror 33 includes one or more mirrors whose angles (reflection directions) are adjustable by the full mirror drive unit 34. The lens drive unit 32 and the full mirror drive unit 34 function as an optical drive unit 39 that adjusts the optical path and the optical path length L between the half mirror 21 and the display 22.

In a display system 1A illustrated in FIG. 2, the display 22 is disposed directly facing the half mirror 21. In a display system 1B of the modification illustrated in FIG. 3, the optical path of the display object DI is bent by the full mirror 33. The display system 1B can realize a compact configuration as compared with the display system 1A.

The processing unit 10 includes a data processing unit 11, an I/F unit 12, a gaze line recognition unit 13, a distance recognition unit 14, a user recognition unit 15, an environment recognition unit 16, an optical system recognition unit 17, a timer 18, and a storage unit 19, for example. The processing unit 10 acquires, via the I/F unit 12, sensor information detected by the sensor unit 40 and optical drive information output from the optical drive unit 39.

Based on the information detected by the gaze line sensor LS, the gaze line recognition unit 13 generates gaze line information of the user US directing their gaze line toward the half mirror 21. The gaze line information includes information related to the position of an eye EY of the user US and the direction of the gaze line. The gaze line recognition processing is implemented by using a known eye tracking technique. In the presence of a plurality of users US, simultaneous detection of a plurality of gaze lines is performed by using a technology such as OpenGaze.

The distance recognition unit 14 generates distance information of the real object ROB existing in the external area based on the information detected by the distance measuring sensor DS. The distance information includes, for example, information regarding the distance in the depth direction between the real object ROB and the half mirror 21. An example of the depth direction is a normal direction of the half mirror 21.

The user recognition unit 15 extracts an image of the user US directing their gaze line toward the half mirror 21 in the visible light image of the external area captured by the visible light camera 41. The user recognition unit 15 generates operation information of the user US based on the extracted image of the user US. The motion information includes, for example, information related to a status of work or a gesture performed by the user US while viewing the half mirror 21.

The environment recognition unit 16 generates environment information related to brightness of the external area based on the information detected by the ambient light sensor 44.

The optical system recognition unit 17 generates optical information indicating the current optical status of the superimposition optical system 30 based on the information output from the optical drive unit 39. The optical information includes, for example, information such as the current position and focal length of the lens unit 31, and information such as the current position and angle of the full mirror 33.

The data processing unit 11 drives the information presentation unit 20, the optical drive unit 39, and the sensor unit 40 synchronously based on the timing signal generated by the timer 18. The data processing unit 11 detects the gaze point GP on the virtual image VI of the real object ROB based on the gaze line information of the user US, and presents the display object DI at a position in the depth direction corresponding to the gaze point GP. The data processing unit 11 includes a gaze point calculation unit 51, a depth calculation unit 52, a display generation unit 53, a brightness calculation unit 54, and a drive calculation unit 55, for example.

The gaze point calculation unit 51 calculates the gaze point GP on the virtual image VI reflected on the half mirror 21 based on the gaze line information acquired from the gaze line recognition unit 13. For example, the point of the virtual image VI on an extension line connecting the position of the eye EY of the user US and the gaze position of the user US on the half mirror 21 is calculated as the gaze point GP of the user US.

The depth calculation unit 52 generates depth information related to the depth of the gaze point GP. The depth information includes information related to the distance in the depth direction from the half mirror 21 to the gaze point GP (depth distance of the gaze point GP). The depth distance of the gaze point GP is equal to a distance in the depth direction from the half mirror 21 to a corresponding point CP on a real image RI corresponding to the gaze point GP (which is a distance defined as a depth distance DP of the corresponding point CP). The depth calculation unit 52 extracts the depth distance DP of the corresponding point CP from the distance information acquired from the distance recognition unit 14. The depth calculation unit 52 generates depth information of the gaze point GP based on the depth distance DP of the corresponding point CP.

The display generation unit 53 generates a display object DI to be superimposed on the virtual image VI. The display object DI includes image information and character information related to the gaze point GP. For example, in a case where the display system 1 is used as a makeup mirror, image information and character information indicating information such as a range of makeup, makeup tool application techniques, application positions, and the amount of makeup is generated as the display object DI. The generated display object DI is superimposed by the superimposition optical system 30 on the positions (positions corresponding to the gaze point GP) of the virtual images VI of the eye EY and the nose as makeup application targets.

The brightness calculation unit 54 calculates the brightness of the display object DI based on the environment information acquired from the environment recognition unit 16. For example, in order to enhance the visibility of the display object DI, high brightness is set in a bright environment, and low brightness is set in a dark environment. The information presentation unit 20 adjusts the brightness of the display of the display object DI based on the brightness set by the brightness calculation unit 54.

The drive calculation unit 55 drives the superimposition optical system 30 of the display object DI so as to allow the display object DI to be observed as an image having a depth corresponding to the depth information. For example, the drive calculation unit 55 calculates an intended optical status of the superimposition optical system 30 based on the depth information acquired from the depth calculation unit 52. The optical status includes optical arrangement of the lens unit 31 and the full mirror 33 (the position of the lens unit 31, the rotational posture of the full mirror 33, and the like), and optical characteristics (focal length of variable focus lens included in the lens unit 31, distribution of the phase modulation amount of the phase modulation element, and the like). The drive calculation unit 55 detects the current optical status of the superimposition optical system 30 based on the optical information acquired from the optical system recognition unit 17. The drive calculation unit 55 calculates a drive amount of the superimposition optical system 30 for obtaining an intended optical status.

The drive amount of the superimposition optical system 30 includes the drive amount of the lens unit 31 by the lens drive unit 32 and the drive amount of the full mirror 33 by the full mirror drive unit 34. The drive calculation unit 55 controls the optical arrangement and optical characteristics of the lens unit 31 and the full mirror 33 included in the superimposition optical system 30 to adjust the position at which the display object DI is observed. The drive calculation unit 55 calculates the drive amount of the superimposition optical system 30 based on the relative position (gaze line information) between the eye EY of the user US and the gaze point GP so as to allow the display object DI to be observed even when the user US obliquely looks into the half mirror 21.

The optical drive unit 39 drives the superimposition optical system 30 based on the calculated drive amount. This allows an optical path length OP between the half mirror 21 and the display 22 to match the depth distance of the gaze point GP (the depth distance DP of the corresponding point CP).

The depth calculation unit 52 determines a status in which the gaze is performed based on user information acquired from the user recognition unit 15 and setting information STI stored in the storage unit 19. The depth calculation unit 52 determines the generation timing and the generation range of the depth information based on the status in which the gaze is performed.

The status in which the gaze is performed is classified into several statuses based on a request (response performance) for a response time taken from the time of detection of the gaze point GP to the time at which the display object DI is presented. In a status where high response performance is required, the depth information needs to be constantly monitored. In a status where high response performance is not required, the depth information is generated after the gaze point GP is detected or after it is determined that work near the gaze point GP continues to occur.

For example, in a case where a status in which the depth information needs to be constantly monitored is detected as a status in which the gaze is performed, the depth calculation unit 52 constantly generates a depth map indicating the depth distribution of the virtual image VI. The drive calculation unit 55 controls the drive of the superimposition optical system 30 based on the depth information of the gaze point GP extracted from the depth map. Incidentally, constantly generating the depth map means generating the depth map at certain time intervals based on the timing signal regardless of whether the gaze point GP has been detected.

Examples of the status in which the depth information should be constantly monitored include a status in which detailed work is performed on the irregularities and a status in which work for ensuring safety is performed. Examples of the former include a status in which a makeup work is performed. Examples of the latter include a status in which the display system 1 is used as an in-vehicle rearview mirror. The status in which the makeup work is performed is detected based on user information, for example. The status in which the display system 1 is used as an in-vehicle rearview mirror is detected based on the setting information STI, for example.

Figure 15:
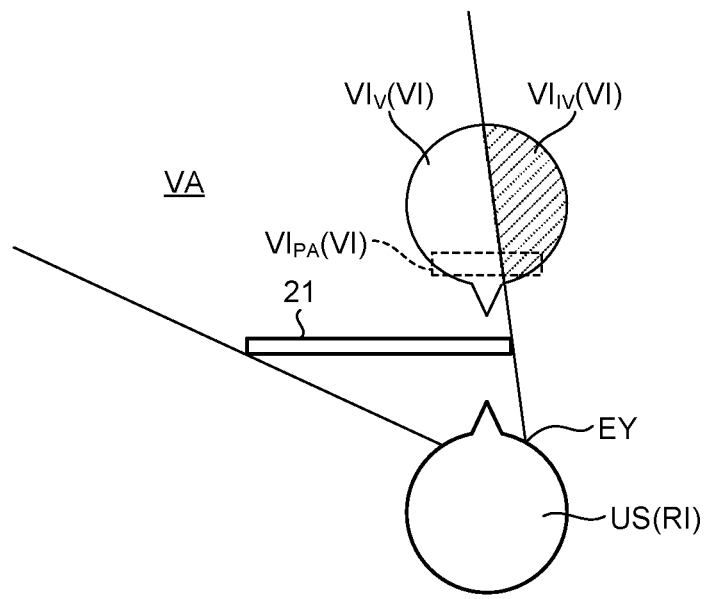
FIG. 15 is a diagram illustrating an example of a generation range of distance information by a distance recognition unit.

In order to reduce the processing, the depth calculation unit 52 sets, among the virtual images VI reflected on the half mirror 21, a virtual image VI in a specific range according to the status where gaze is performed, as a gaze target region $VI_{PA}$ (refer to FIG. 15). The depth calculation unit 52 selectively generates a depth map for the gaze target region $VI_{PA}$. For example, when the makeup work is performed, the gaze target is mainly the upper part of the face (such as eyes and eyebrows). Accordingly, upper regions of the face of the user US reflected on the half mirror 21 is set as the gaze target region $VI_{PA}$, and the depth map is selectively generated for the gaze target region $VI_{PA}$.

The information related to the various settings, conditions, and criteria described above is included in the setting information STI. The setting information STI and a program PG used for the above-described processing are stored in the storage unit 19. The program PG is a program that causes a computer to execute information processing according to the present embodiment. The processing unit 10 performs various types of processing in accordance with the program PG stored in the storage unit 19. The storage unit 19 may be used as a work area for temporarily storing a processing result of the processing unit 10. The storage unit 19 includes, for example, any non-transitory storage medium such as a semiconductor storage medium and a magnetic storage medium. The storage unit 19 includes an optical disk, a magneto-optical disk, or flash memory, for example. The program PG is stored in a non-transitory computer-readable storage medium, for example.

The processing unit 10 is a computer including a processor and memory, for example. The memory of the processing unit 10 includes random access memory (RAM) and read only memory (ROM). By executing the program PG, the processing unit 10 functions as the data processing unit 11, the I/F unit 12, the gaze line recognition unit 13, the distance recognition unit 14, the user recognition unit 15, the environment recognition unit 16, the optical system recognition unit 17, the timer 18, the gaze point calculation unit 51, the depth calculation unit 52, the display generation unit 53, the brightness calculation unit 54, and the drive calculation unit 55.

3. Information Processing Method

Figure 7:
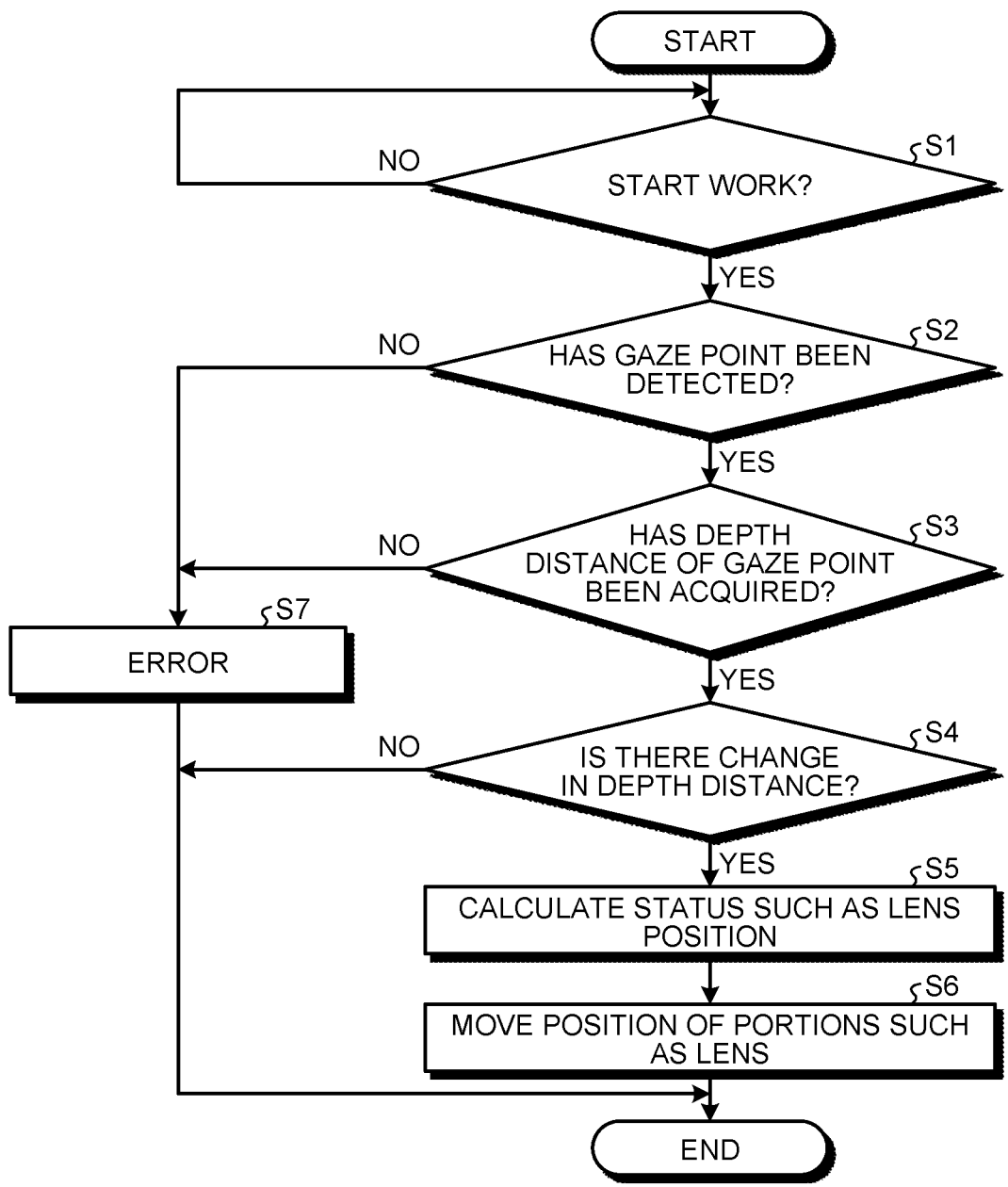
FIG. 7 is a diagram illustrating a flow of information processing.

FIG. 6 is a diagram illustrating an adjustment example of the superimposition optical system 30 according to a change in the gaze point GP. FIG. 7 is a diagram illustrating a flow of information processing. The processing of FIG. 7 will be described with reference to FIG. 6.

In step S1, the data processing unit 11 determines whether the user US has started work based on sensor information. For example, in a case where the eye EY of the user US has been detected continuously for a preset time or more based on the gaze line information, it is determined that the work has started.

In a case where it is determined in step S1 that the work has not been started (step S1: No), step S1 is repeated until the work is started. In a case where it is determined in step S1 that the work has been started (step S1: Yes), the processing proceeds to step S2. In step S2, the gaze point calculation unit 51 determines whether the gaze point GP of the user US has been detected.

For example, the gaze point calculation unit 51 calculates a point of the virtual image VI on the extension line connecting the position of the eye EY of the user US and the gaze position of the user US on the half mirror 21 as the gaze point GP of the user US (refer to FIG. 5). In a case where the gaze point GP has been successfully calculated, the gaze point calculation unit 51 determines that the gaze point GP has been detected. In the example in the upper part of FIG. 6, the nose of the user US reflected on the half mirror 21 is detected as the gaze point GP. In a case where the gaze line of the user US is blocked by a tool or the like used by the user US and the gaze position of the user US on the half mirror 21 cannot be specified, the gaze point calculation unit 51 determines that the gaze point GP is not detected.

In a case where it is determined in step S2 that the gaze point GP is not detected (step S2: No), the processing proceeds to step S7. In step S7, the data processing unit 11 determines that an error has occurred, and ends the processing. In a case where it is determined in step S2 that the gaze point GP has been detected (step S2: Yes), the processing proceeds to step S3. In step S3, the depth calculation unit 52 determines whether the depth distance of the gaze point GP has been acquired.

For example, the depth calculation unit 52 acquires the depth distance DP of the corresponding point CP as the depth distance of the gaze point GP. When the depth distance DP of the corresponding point CP has been acquired, the depth calculation unit 52 determines that the depth distance of the gaze point GP has been acquired, and generates depth information of the gaze point GP. In a case where the corresponding point CP is blocked by a tool or the like used by the user US and the depth distance DP of the corresponding point CP has not been successfully acquired, the depth calculation unit 52 determines that the depth distance of the gaze point GP cannot be acquired.

In a case where it is determined in step S3 that the depth distance of the gaze point GP cannot be acquired (step S3: No), the processing proceeds to step S7. In step S7, the data processing unit 11 determines that an error has occurred, and ends the processing. In a case where it is determined in step S3 that the depth distance of the gaze point GP has been acquired (step S3: Yes), the processing proceeds to step S4. In step S4, the depth calculation unit 52 determines whether there is a change in the depth distance of the gaze point GP.

For example, the depth calculation unit 52 stores the previously generated depth information of the gaze point GP (the nose of the user US in the example in the upper part of FIG. 6). The depth calculation unit 52 extracts depth distance of the previous gaze point GP from the previous depth information of the gaze point GP. The depth calculation unit 52 compares the newly detected depth distance of the latest gaze point GP with the previous depth distance of the gaze point GP. In the lower example of FIG. 6, the forehead of the user US reflected on the half mirror 21 is detected as the latest gaze point GP. The depth calculation unit 52 outputs a difference between a depth distance $DP_{fh}$ of the forehead and a depth distance $DP_{ns}$ of the nose as a comparison result. As a result of the comparison, when the difference between the two is larger than a threshold, the depth calculation unit 52 determines that there is a change in the depth distance of the gaze point GP. When the difference is equal to or less than the threshold, the depth calculation unit 52 determines that there is no change in the depth distance of the gaze point GP.

In a case where it is determined in step S4 that there is no change in the depth distance of the gaze point GP (step S4: Yes), the data processing unit 11 ends the processing. In a case where it is determined in step S4 that there is a change in the depth distance of the gaze point GP (step S4: Yes), the processing proceeds to step S5. In step S5, the drive calculation unit 55 calculates an intended optical status of the superimposition optical system 30 such as a lens position.

In step S6, the drive calculation unit 55 calculates a drive amount of the superimposition optical system 30 for obtaining an intended optical status. The drive calculation unit 55 controls the optical drive unit 39 based on the calculated drive amount to move the lens position and the like. This allows the display object DI to be presented at a position in the depth direction corresponding to the gaze point GP.

4. Control of Presentation Position of Display Object

4-1. Variations of Superimposition Optical System

Figure 8:
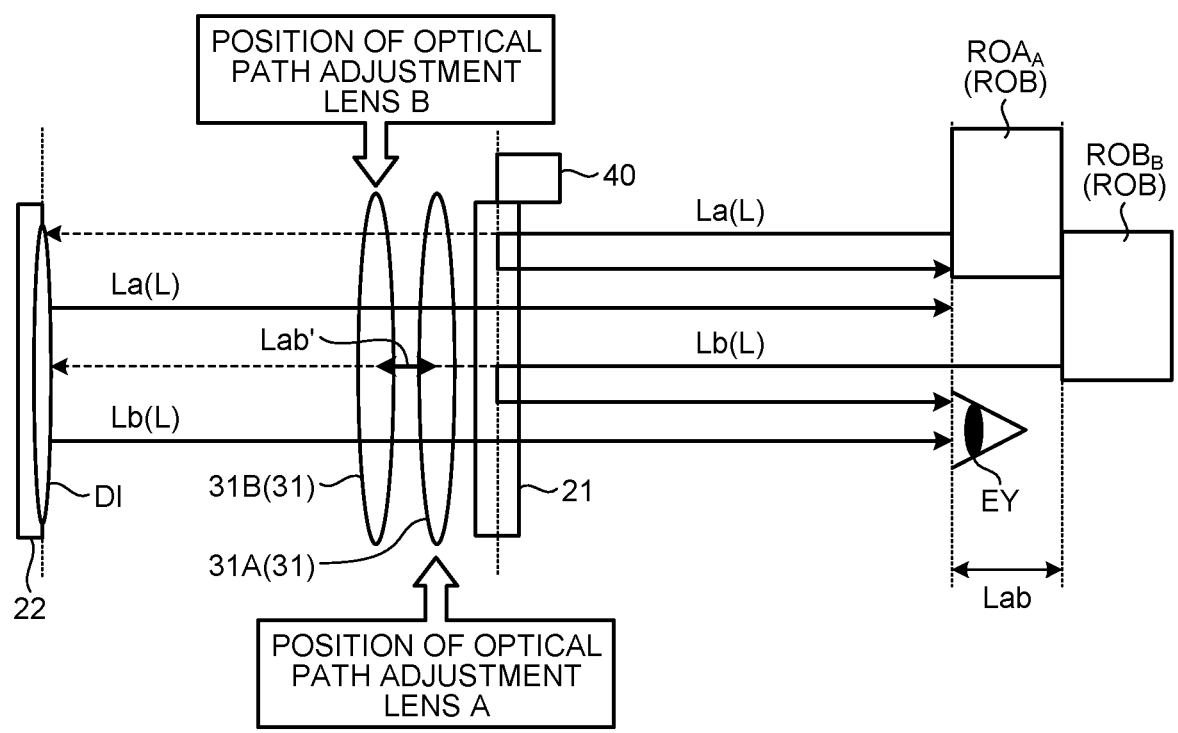
FIG. 8 is a diagram illustrating a variation of the superimposition optical system.
Figure 9:
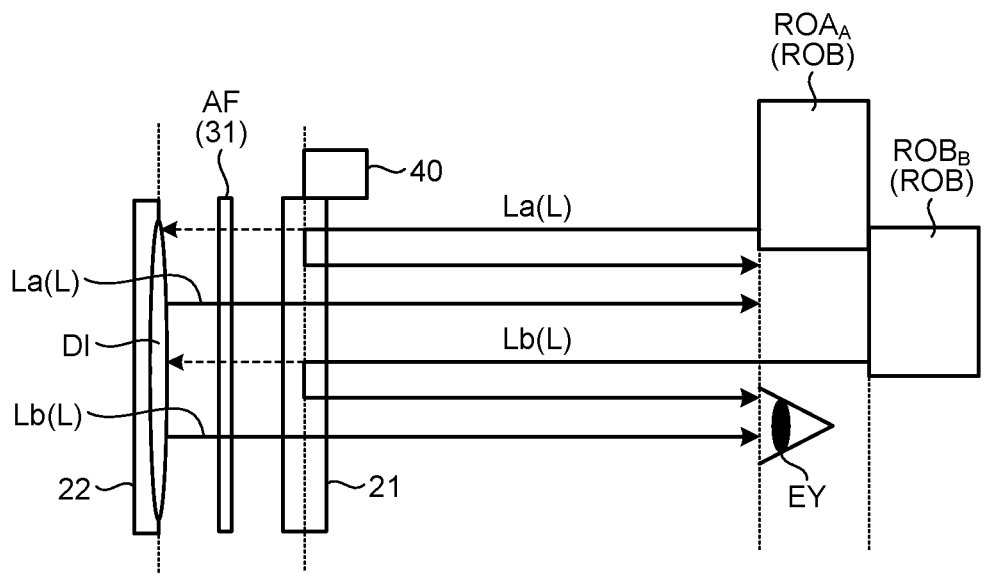
FIG. 9 is a diagram illustrating a variation of the superimposition optical system.
Figure 10:
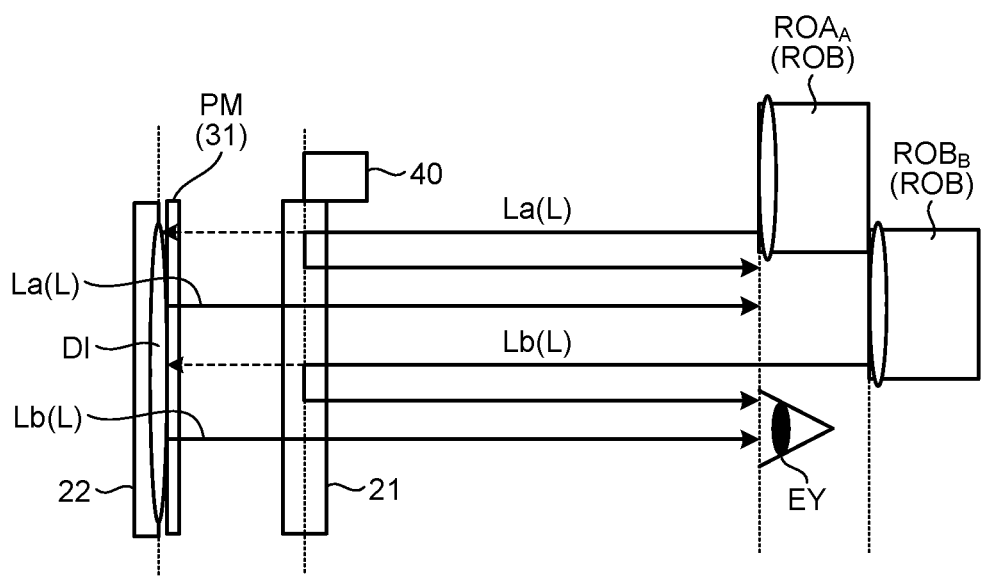
FIG. 10 is a diagram illustrating a variation of the superimposition optical system.

FIGS. 8 to 10 are diagrams illustrating variations of the superimposition optical system 30.

In the example of FIG. 8, the optical path length L of the superimposition optical system 30 is adjusted by changing the position of the lens unit 31. With the changed optical path length L, the presentation position of the display object DI in the depth direction is changed. A lens unit 31A indicates the lens unit 31 which has the arrangement adjusted according to the position of the first real object $ROB_A$. A lens unit 31B indicates the lens unit 31 which has the arrangement adjusted according to the position of the second real object $ROB_B$. The lens unit 31A is arranged close to the half mirror 21 by a distance Lab' corresponding to the distance Lab between the first real object $ROB_A$ and the second real object $ROB_B$.

In the example of FIG. 9, the optical path length L of the superimposition optical system 30 is adjusted using a variable focus lens AF included in the lens unit 31. By controlling the focal length of the variable focus lens AF, the drive calculation unit 55 adjusts the position in the depth direction at which the display object DI is observed.

In the example of FIG. 10, the optical path length L of the superimposition optical system 30 is adjusted using a phase modulation element PM included in the lens unit 31. The phase modulation element PM is a liquid crystal element having a plurality of pixels capable of independently adjusting the phase modulation amount. The drive calculation unit 55 independently drives each pixel to control the phase modulation amount of the phase modulation element PM for each region. This allows the drive calculation unit 55 to adjust the position in the depth direction at which the display object DI is observed.

Figure 11:
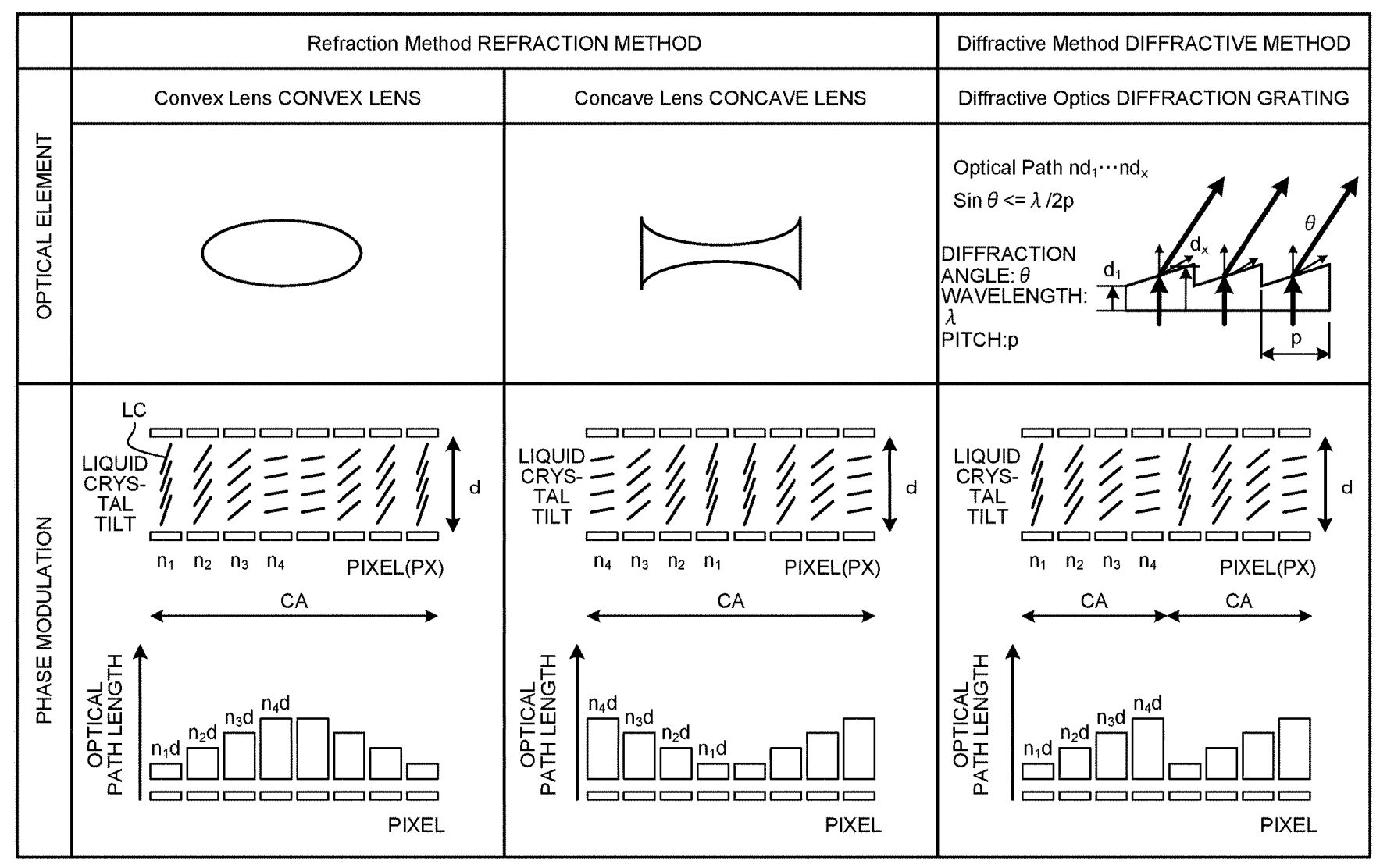

FIG. 11 is a diagram illustrating an example of an optical element implemented by the phase adjustment element PM.

The phase adjustment element PM controls the alignment of the liquid crystal LC for each pixel PX, thereby functioning as an optical element such as a convex lens, a concave lens, and a diffraction element. For example, the liquid crystal layer of each pixel PX is set to a thickness d which is constant. The refractive index of the liquid crystal layer changes depending on the alignment state of the liquid crystal LC. By controlling refractive indexes (n1, n2, n3, n4) of the plurality of pixels PX included in the region CA so as to gradually increase from the external area toward the center of the region CA, a convex lens is generated (the left diagram of FIG. 11). Conversely, by controlling the refractive index of the region CA so as to gradually increase from the center of the region CA toward the external area, a concave lens is generated (center diagram of FIG. 11). By arranging a large number of the regions CA, a region in which the refractive index uniformly increases, so as to have steps of the refractive index at the boundary between the regions CA, a diffraction grating is generated (the right diagram of FIG. 11).

By disposing the phase modulation element PM between the display 22 and the half mirror 21, it is possible to electrically produce any luminosity distribution. This eliminates necessity to perform movement control for moving the position of the lens unit 31, achieving simplification of the optical drive unit 39. The phase adjustment element PM can independently control the phase adjustment amount for each region CA. Therefore, even when a plurality of users US is viewing a mutually different position, the presentation position of the display object DI in the depth direction can be adjusted in accordance with the gaze point GP of each user US.

4-2. Adjustment of Magnification of Display Object

Changing the arrangement and optical characteristics of the lens unit 31 can change the magnification and change the size of the display object DI observed by the user US. Therefore, the processing unit 10 includes a means of canceling a change in the display magnification of the display object DI accompanying the driving of the superimposition optical system 30. For example, the display generation unit 53 adjusts the size of the display object DI so as to cancel the change in the display magnification of the display object DI accompanying the driving of the superimposition optical system 30.

The change in magnification may be adjusted by a magnification adjustment lens (for example, a beam expander) provided in the superimposition optical system 30. For example, the drive calculation unit 55 adjusts the size of the display object DI by the beam expander included in the superimposition optical system 30 so as to cancel the change in the display magnification of the display object DI accompanying the driving of the superimposition optical system 30.

4-3. Processing in Case of Failure in Gaze Line Detection

In the case of a failure in the detection of the gaze line ES due to some error, the following processing is performed. For example, the data processing unit 11 has, as operation modes, a normal mode performed in a status where gaze line detection is feasible and an error handling mode performed in a status where gaze line detection is infeasible.

In the normal mode in which the gaze line ES is detectable, the gaze point calculation unit 51 calculates the gaze point GP based on the gaze line ES. In the error handling mode in which the gaze line ES is not detectable, the gaze point calculation unit 51 calculates the gaze point GP based on indirect information suggesting the gaze line ES. Examples of the indirect information include information manually input by the user US, information such as the orientation of the face of the user US, and information of a tool used for work on the gaze point GP. In a case where the gaze point calculation unit cannot detect the gaze line ES, the gaze point calculation unit 51 can notify the user US using display, sound, vibration, or the like.

4-4. Calibration

The calibration may be performed according to the presentation status of the display object DI. For example, the half mirror 21 is captured from a camera installed near the user US. The depth calculation unit 52 determines whether the display object DI is presented at a desired position based on the captured image. For example, the depth calculation unit 52 generates calibration information based on the deviation of the presentation position of the display object DI. The calibration information includes, for example, information related to misalignment between an intended presentation position of the display object DI and an actual presentation position. The drive calculation unit 55 corrects a parameter for calculating the drive amount of the superimposition optical system 30 based on the calibration information.

The calibration may be performed based on information manually input by the user US. For example, the user US performs a gesture such as rubbing with a finger on a portion where misalignment occurs in the presentation position of the display object DI. The drive calculation unit 55 corrects a parameter for calculating the drive amount of the superimposition optical system 30 based on the gesture of the user US.

5. Detection Timing of Depth Information

Figure 12:
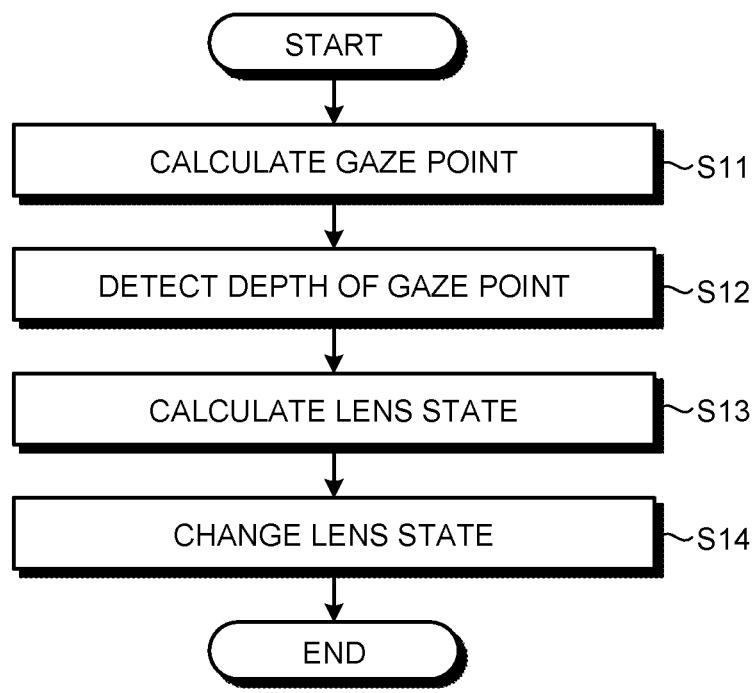
FIG. 12 is a diagram illustrating a variation of detection timing of depth information.
Figure 13:
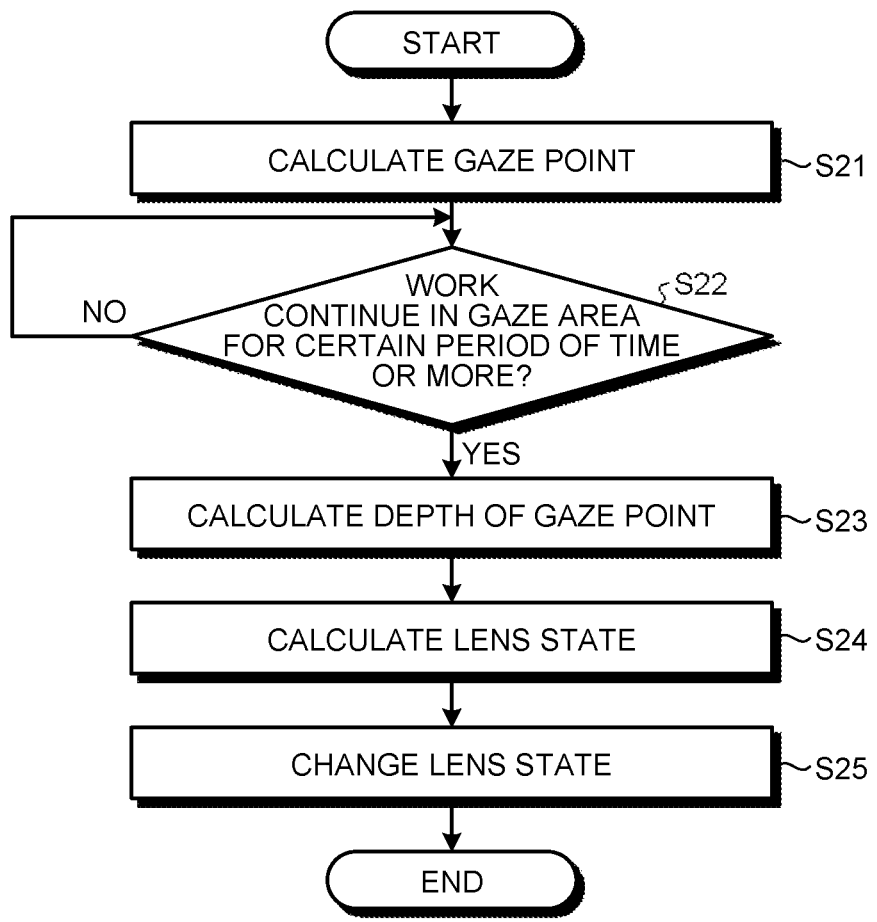
FIG. 13 is a diagram illustrating a variation of detection timing of depth information.
Figure 14:
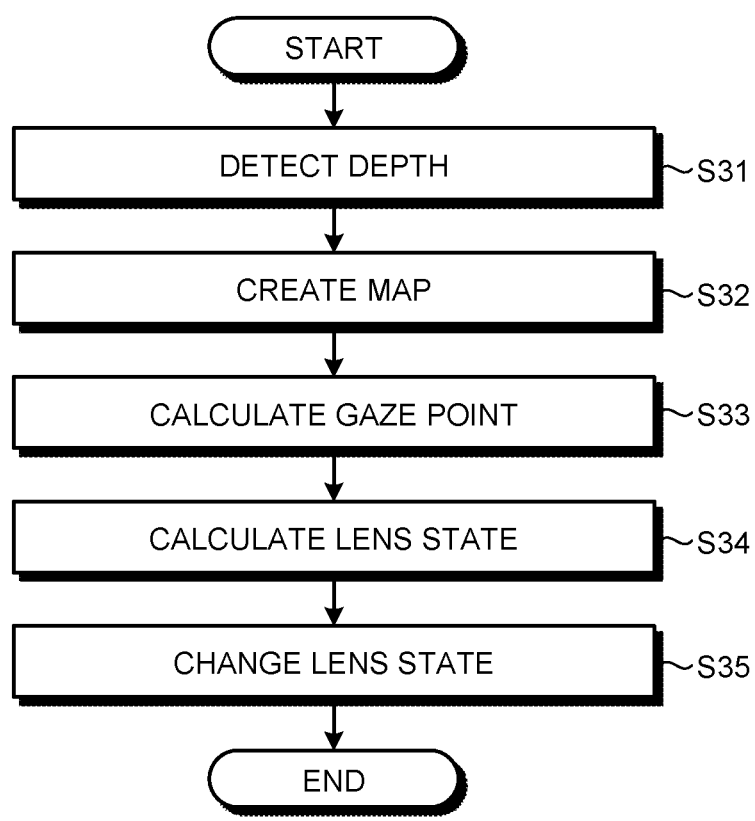
FIG. 14 is a diagram illustrating a variation of detection timing of depth information.

FIGS. 12 to 14 are diagrams illustrating variations of the detection timing of the depth information.

As described above, the depth calculation unit 52 determines the generation timing and the generation range of the depth information based on the status where the gaze is performed. The examples of FIGS. 12 and 13 correspond to a status where high response performance is not required for display of the display object DI. In this status, the generation of the depth information is performed after the calculation of the gaze point GP.

For example, in the example of FIG. 12, after the gaze point GP is calculated in step S11, the depth distance of the gaze point GP is detected in step S12. The depth information of the gaze point GP is generated based on the depth distance. Subsequently, an intended lens state is calculated in step S13, and the lens state is change in step S14.

In the example of FIG. 13, after the gaze point GP is calculated in step S21, it is determined in step S22 whether the work continues in the gaze area near the gaze point GP for a certain period of time or more. For example, the depth calculation unit 52 estimates the work specifics of the user based on the user information. When the work specifics of the user are estimated to not end in a short time, the depth calculation unit 52 determines that the work in the gaze area continues for a certain period of time or more. The work specifics estimation and the prediction of the work continuation status can be performed using a neural network trained by machine learning.

When it is determined in step S22 that the work in the gaze area does not continue for the certain period of time or more (step S22: No), the processing returns to step S22. When it is determined in step S22 that the work in the gaze area continues for a certain period of time or more (step S22: Yes), the depth information of the gaze point GP is generated in step S23. Subsequently, an intended lens state is calculated in step S24, and the lens state is changed in step S25.

In the examples of FIGS. 12 and 13, the depth distance is detected only at one point of the gaze point GP. This reduces the processing for generating the depth information. However, there is a possibility that a delay occurs until the superimposition optical system 30 is adjusted after the gaze point GP moves. Therefore, in a case where a large delay has occurred or is expected to occur, the display generation unit 53 performs various types of processing to make the user US less likely to feel a delay as processing performed selectively or in combination.

For example, as first processing, the display generation unit 53 temporarily hides or greys out the display of the display object DI in the delay period occurring during the period from the movement of the gaze point GP to the adjustment of the superimposition optical system 30. As second processing, the display generation unit 53 notifies that the presentation position of the display object DI is being adjusted in the delay period. For example, the notification is performed by effect display. Alternatively, notification is performed by sound. As third processing, the display generation unit 53 gradually changes the observed position of the display object DI within the delay period. For example, the presentation position of the display object DI is changed along the position on the virtual image VI that can be immediately focused. This makes it possible to perform guidance of the gaze position stepwise.

The example of FIG. 14 corresponds to a status in which high response performance is required for the display of the display object DI. In this status, the region of virtual image VI to be a gaze target is specified as the gaze target region $VI_{PA}$. The depth distribution of the entire gaze target region $VI_{PA}$ is constantly detected regardless of the detection timing of the gaze point GP. The depth calculation unit 52 generates a depth distribution as a depth map. The depth calculation unit 52 detects the distribution of the depth every preset time and updates the depth map as needed based on the detection result.

For example, in the example of FIG. 14, in step S31, the depth distribution of the specific range set as the gaze target region $VI_{PA}$ is calculated. In step S32, a depth map indicating depth distribution is generated. In step S33, the gaze point GP of the user US is calculated. In step S34, the depth distance of the gaze point GP is extracted from the depth map, and the intended lens state is calculated based on the extracted depth distance of the gaze point GP. In step S35, the lens state is changed.

6. Generation Range of Distance Information

FIG. 15 is a diagram illustrating an example of a generation range of distance information by the distance recognition unit 14.

The depth calculation unit 52 generates a depth map of the gaze target region $VI_{PA}$ based on the distance information of the real object ROB acquired from the distance recognition unit 14. The distance measuring sensor DS can sense the entire range of the external area, but the distance information necessary for generating the depth map is only the distance information of the real image RI corresponding to the gaze target region $VI_{PA}$. Therefore, the distance recognition unit 14 can restrict the generation range of the distance information in order to reduce the processing.

For example, the distance recognition unit 14 selectively generates only distance information of the real image RI corresponding to a visual field range VA of the user US via the half mirror 21. The distance recognition unit 14 selectively generates distance information of the real image RI corresponding to a virtual image $VI_V$ of the portion visible to the user US, and does not generate distance information of a virtual image $VI_{IV}$ of the portion invisible to the user US. The distance recognition unit 14 can further reduce the processing by restricting the generation range of the distance information to the range of the real image RI corresponding to the gaze target region $VI_{PA}$.

7. Processing when Gaze Line Deviates from Gaze Target Region

Figure 16:
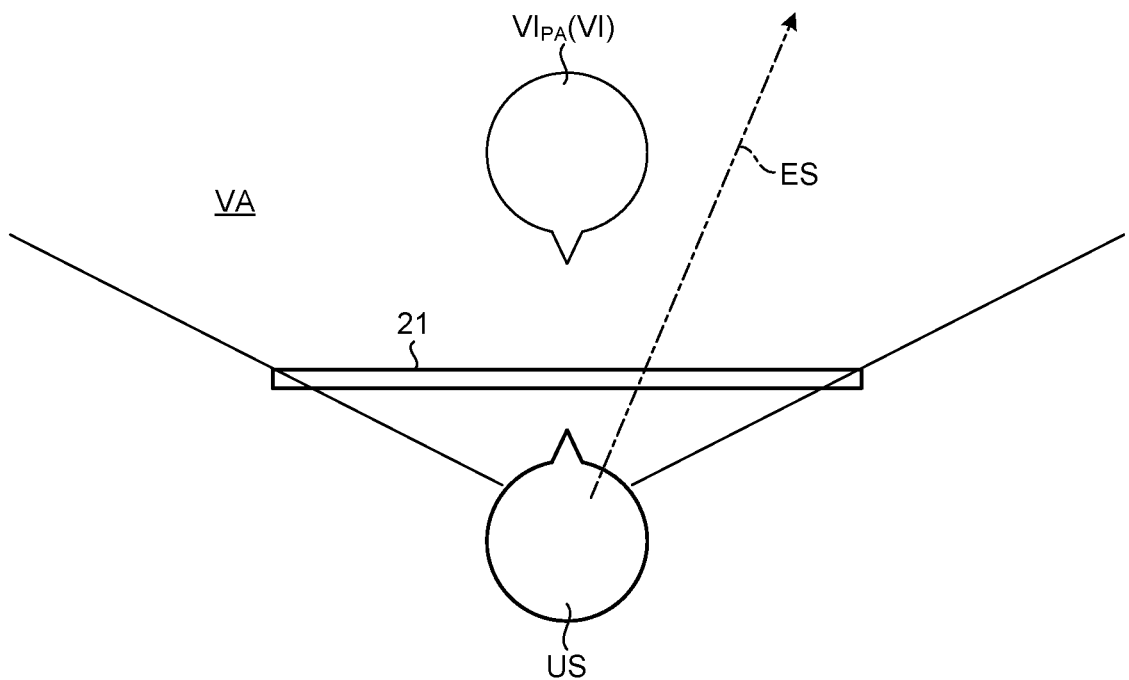
FIG. 16 is a diagram illustrating processing in a case where the gaze line temporarily deviates from the gaze target region.

FIG. 16 is a diagram illustrating processing in a case where the gaze line ES temporarily deviates from the gaze target region $VI_{PA}$.

In the example of FIG. 16, the face of the user US is set as the gaze target region $VI_{PA}$. For example, in a status where the face is the work target like a makeup work, the gaze point GP of the user US is mainly concentrated on the face. Accordingly, the face is set as the gaze target region $VI_{PA}$. However, the attention of user US temporarily deviates from the face during the makeup work in some cases. In the example of FIG. 16, the gaze line ES is directed to a wall, a person, or the like behind the user US. In such a status, it is not always necessary to continue to generate the depth map of the gaze target region $VI_{PA}$.

Therefore, for example, when the gaze point GP temporarily deviates from the gaze target region $VI_{PA}$, the depth calculation unit 52 stops generating the depth map. The depth calculation unit 52 adopts, as the depth information, depth information before the gaze point GP deviates from the gaze target region $VI_{PA}$ or default depth information. The default depth information is included in the setting information STI. The display generation unit 53 stops the output of the display object DI during a period in which the gaze point GP deviates from the gaze target region $VI_{PA}$.

When the gaze on a position other than the gaze target region $VI_{PA}$ is continuously performed, the depth calculation unit 52 cancels the setting of the gaze target region $VI_{PA}$. The depth calculation unit 52 returns the generation timing and the generation range of the depth information to default settings. In the default setting, the generation of the depth information is performed after the gaze point GP is detected, and the generation of the depth map is not performed.

8. Application Example

8-1. Makeup Work

Figure 17:
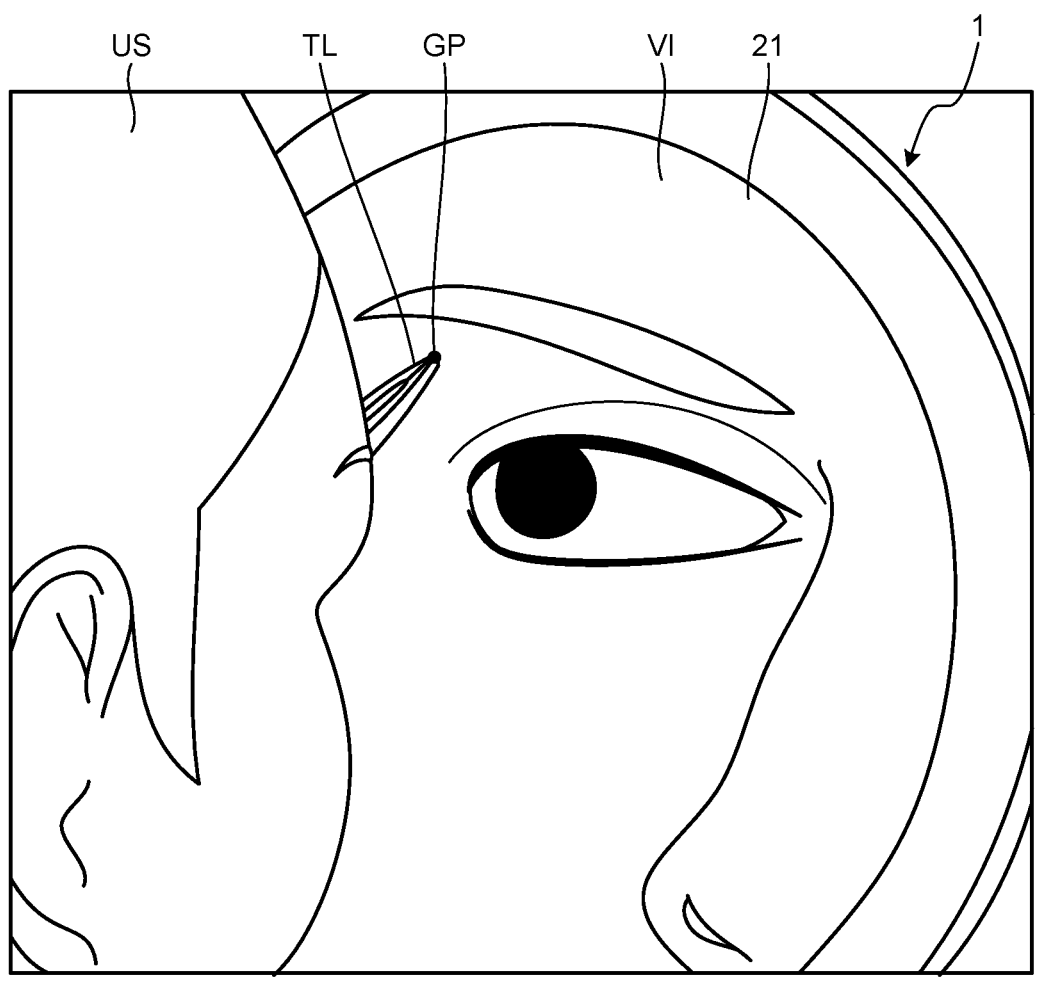
FIG. 17 is a diagram illustrating an example in which the display system is used for makeup work.
Figure 18:
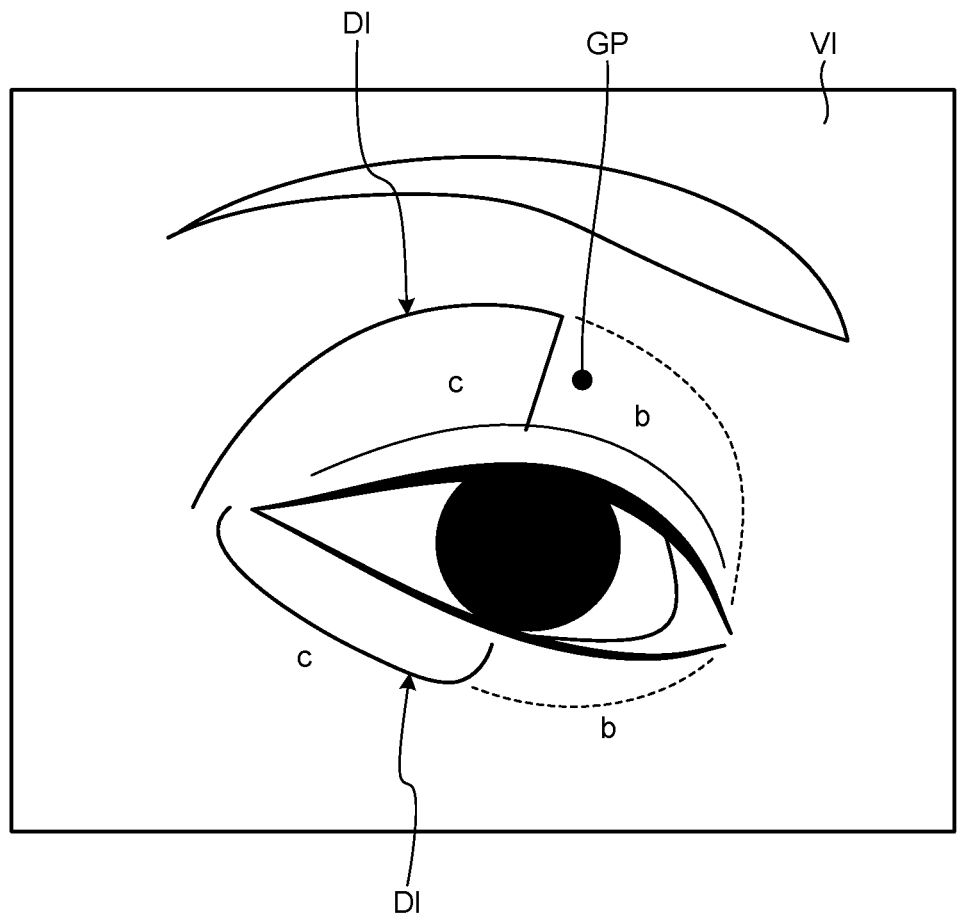
FIG. 18 is a diagram illustrating an example in which the display system is used for makeup work.
Figure 19:
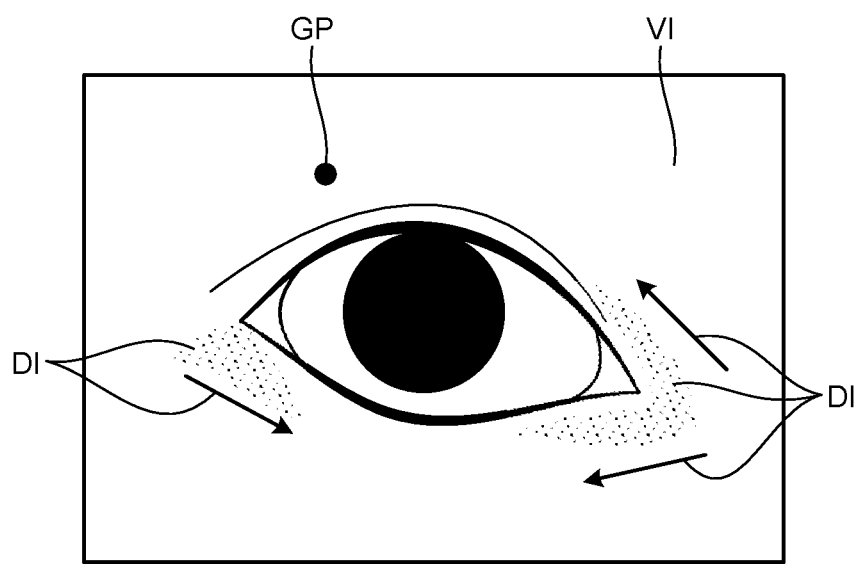
FIG. 19 is a diagram illustrating an example in which the display system is used for makeup work.

FIGS. 17 to 19 are diagrams illustrating examples in which the display system 1 is used for a makeup work.

In the makeup work, an image (such as an enclosing frame surrounding an area) indicating a makeup guide or a makeup target area is superimposed on the face as the display object DI. Basically, it is assumed that one user US sits in front of the half mirror 21 and performs the makeup work. The posture information of the makeup tool TL is acquired from, for example, information obtained by a sensor built in the tool TL or a visible light image of the tool TL captured by the visible light camera 41. Furthermore, information such as the orientation of the body of the user US is acquired based on the user information acquired from the user recognition unit 15.

In the example of FIG. 18, four areas are set around the eye, and each area is divided by an enclosing frame such as a solid line or a dotted line. Character information such as "b" and "c" is added to each area. In the example of FIG. 19, the range for the makeup range and the amount of makeup are indicated by dots. In addition, an arrow indicates how to apply the tool TL. The display object DI is superimposed along irregularities of the face. The display object DI is observed as being drawn directly on the surface of the face. In combination with such a display object DI, the display generation unit 53 notifies the makeup procedure by audio information.

(A) Work Start Timing

Considering that the superimposition target of the display object DI changes, one step is considered as a piece of work. For example, the data processing unit 11 determines that the work has started in a case where the orientation of the body of the user US is directed to the half mirror 21 for a certain period of time or more. The data processing unit 11 can also grasp a more accurate start timing by combining with the posture information of the tool TL.

(B) Detecting Gaze Line

Since the object to be gazed by the user US is a face having continuous fine irregularities, it is necessary to detect the gaze point GP with high accuracy. Therefore, it is necessary to calculate the gaze point GP of the user US by constantly detecting the gaze line ES to be able to handle a minute change.

(C) Depth Detection Timing

The accuracy of depth detection can be improved by also using the posture information of the tool TL together. For example, in a case where the change amount of the inclination of the tool TL is small, it can be determined that the same work has been continued for a certain period of time. In this manner, it is possible to read, from the posture information of the tool TL, the intention of the user US to continue the work, such as whether the user US has just looked at the target for a moment or is gazing at the target.

There is another case where, at the time of the makeup work, the eye EY of the user US overlaps the tool TL, leading to the failure in detecting the gaze line ES. In this case, it is possible to use, as indirect information, for example, the direction of the tool TL and the movement of the hand determined from the visible light image acquired by the visible light camera 41, making it possible to estimate the object considered to be the next target of gaze of the user US. Moving the lens unit 31 with prior detection of depth distribution of the estimated object as a depth map makes it possible to perform the control without delay.

(D) Optical Control

In consideration of possible application to a cosmetic table for home use or the like, a conceivable optical control system would be the one as illustrated in FIG. 3 or 10, which can be downsized.

(E) Work End Timing

For example, the data processing unit 11 determines that the work is ended when the user US releases the tool TL from the hand and ends one step.

(F) Gaze Line Guidance

In a case where there are a plurality of virtual image regions (eyelids, eyelashes, and the like) having different depths at the gaze point GP, the display object DI can be presented at an appropriate position with gaze line guidance being performed. For example, in a case where the user US gazes at a boundary between two virtual image regions having slightly different depths, it is difficult to correctly perform superimposition on the two virtual image regions. In this case, in a state where both distances are held as the depth distance, the display object DI is positioned at one of the depths first, and the gaze line ES of the user US is to be tracked.

In a case where the display object DI is superimposed on the virtual image region on the deeper side and the user US continues gazing at the superimposed position on the deeper side without stopping, it is considered that the user US has intended to view the virtual image region on the deeper side. In this case, the presentation position of the display object DI can be set, with no movement, at the virtual image region on the deeper side. However, in a case where the gaze is changed to the virtual image region on the front side, it is considered that the user US has intended to view the virtual image region on the front side. In this case, by moving the presentation position of the display object DI to the virtual image region on the front side, it is possible to achieve presentation of the display object DI matching the gaze intention of the user US.

Specifically, when gaze point GP has been detected at a boundary between two virtual image regions having different depth directions, the display generation unit 53 first generates a display object DI to be superimposed on one virtual image region. The drive calculation unit 55 drives the superimposition optical system 30 based on the depth information of the one virtual image region. The user US observes the display object DI presented as an image having a depth corresponding to the depth information of the one virtual image region.

Next, the gaze point calculation unit 51 calculates the gaze point GP of the user US observing the display object DI whose presentation position has been adjusted as described above. When the gaze point GP has moved to the other virtual image region, the drive calculation unit 55 drives the superimposition optical system 30 based on the depth information of the other virtual image region. The display generation unit 53 gradually changes the observed position of the display object DI within a period in which the adjustment of the superimposition optical system 30 is performed based on the depth information of the other virtual image region.

As another solution, it is also conceivable to seamlessly change the phase of light by using the phase modulation element PM. In this case, the display object DI can be simultaneously superimposed on the two virtual image regions, and similarly to the case described above, the virtual image region that the user US has intended to gaze at can be determined by the movement of the gaze point GP of the user US immediately after the presentation.

8-2. Digital Signage

Figure 20:
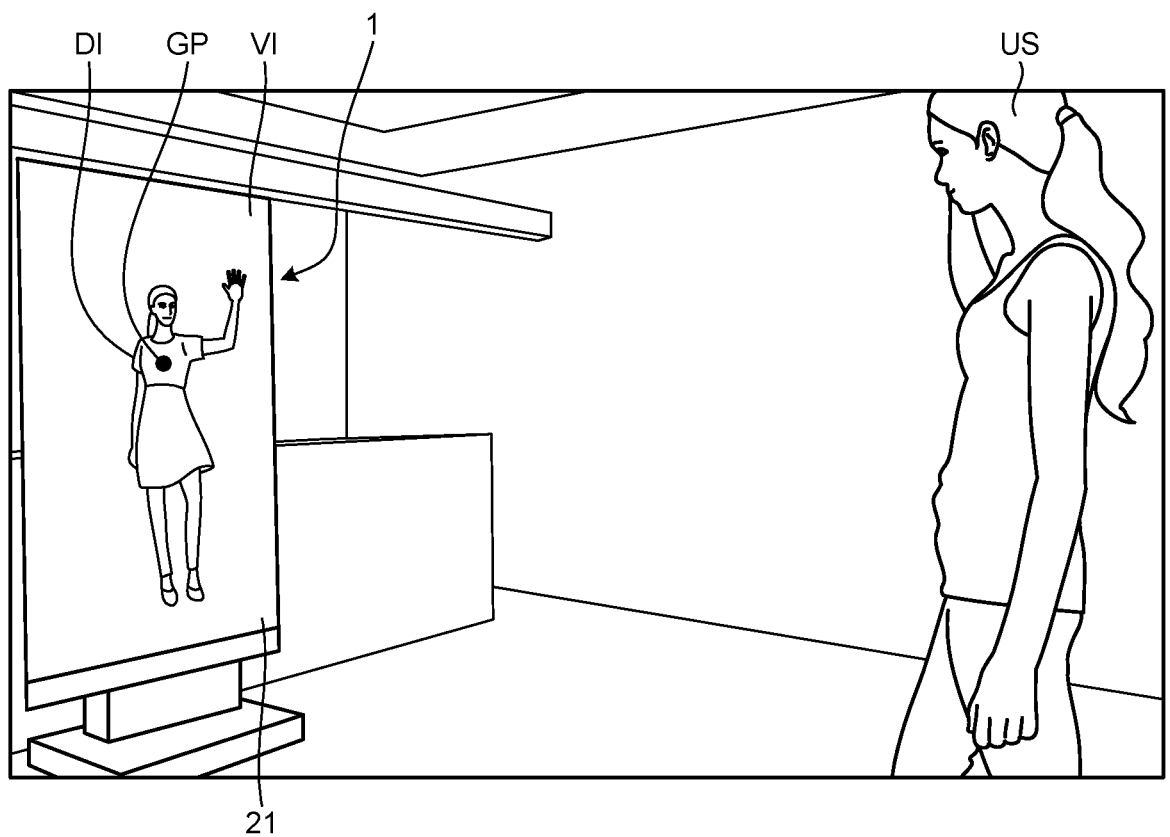
FIG. 20 is a diagram illustrating an example in which the display system is used for digital signage.

FIG. 20 is a diagram illustrating an example in which the display system 1 is used for digital signage.

For example, as an advertisement or as a digital signage for window shopping, an image or character information regarding a product is superimposed as the display object DI on the virtual image VI of the user US or the real object ROB in the surrounding environment. Use in public space is conceivable. At this time, it is assumed that a plurality of users US views the half mirror 21 from various angles.

(A) Work Start Timing

In a case where it is desired to present the display object DI to an unspecified number of users US, the user US gazing at the half mirror 21 is specified based on the visible light video image acquired from the visible light camera 41. For example, the data processing unit 11 determines that the work is started when the direction of the gaze line ES of the user US is directed to the half mirror 21 for a certain period of time or more. However, in a case where it is desired to present the display object DI only to the user US who is interested, it is conceivable to acquire information such as orientation of the body of the user US from the visible light video image, and start only when the body is directed to the half mirror 21.

(B) Detecting Gaze Line

The gaze lines of the plurality of users US are detected using the visible light image acquired from the visible light camera 41. Gaze line detection is performed by using a technology such as OpenGaze capable of detecting gaze of a plurality of persons, for example.

(C) Depth Detection Timing

In the example of FIG. 20, try-on of clothes is performed by image composition. The user US selects clothes to try on, and gazes at a body part for the try-on. The depth information is implemented after the gaze point GP is calculated. The display generation unit 53 outputs the image of the selected clothes as the display object DI. The drive calculation unit 55 presents the display object DI at a position in the depth direction corresponding to the gaze point GP.

In the digital signage, it is also conceivable to guide the gaze line ES of the user US to a specific area (for example, a product display area). By monitoring the gaze point GP and proactively performing display guiding the gaze line ES of the user US, the effect of the advertisement can be enhanced.

For example, the depth calculation unit 52 can generate, as preliminary information, depth information of one or more predicted gaze points, which are points at which gaze is predicted. The drive calculation unit 55 extracts, from the preliminary information, depth information of the predicted gaze point that matches the gaze point GP. The drive calculation unit 55 controls driving of the superimposition optical system 30 based on the extracted depth information.

In a case where a group of a plurality of persons looks into the half mirror 21, there is a possibility that their faces are directed sideways at the time of conversation with other persons. In this case, the display can be continued when their faces are returned to the signage direction within a certain time as a threshold. In this case, the position of the display object DI in the depth direction can be locked with the position immediately before turning sideways.

(D) Optical Control

Since a plurality of users looks into the system from various angles, it is conceivable to use an optical control system combining the systems in FIGS. 3 and 10.

(E) Work End Timing

For example, the data processing unit 11 determines the end of work when the user US has left. However, in the case of situation such as an advertisement system in a public place, stopping the display immediately after the user US has left could give the advertisement an impression of abruptness when viewed from a third party. Therefore, the display is continued until the end of a group of video and audio (one loop) flowing as a piece of advertisement. This makes it possible to end the advertisement without impairing the visual effects. In a case where there is another user US, it is also conceivable to present a video in which the display of the display object DI is adjusted to fit a position in the depth direction corresponding to the user US or a video that gradually fades.

8-3. In-Vehicle Rearview Mirror

Figure 21:
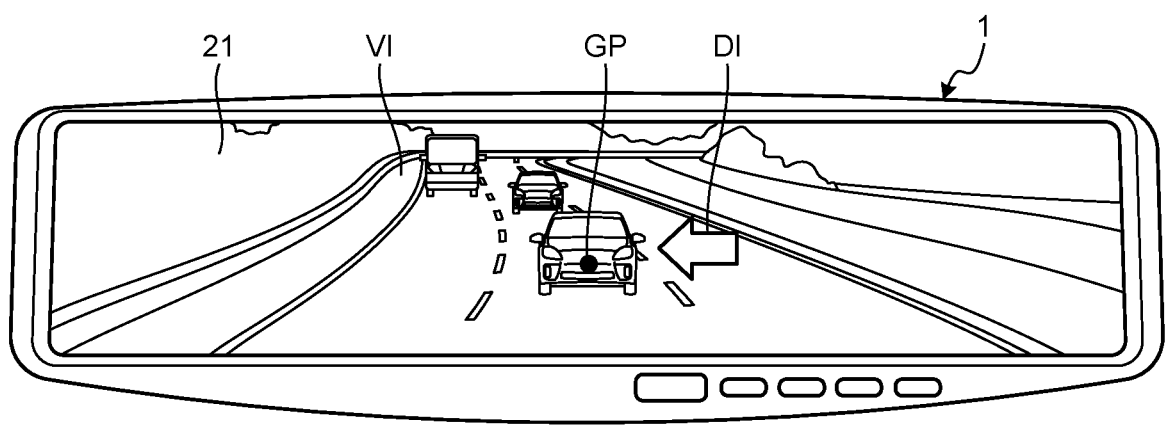
FIG. 21 is a diagram illustrating an example in which the display system is used for an in-vehicle rearview mirror.

FIG. 21 is a diagram illustrating an example in which the display system 1 is used for an in-vehicle rearview mirror.

In recent years, in-vehicle rearview mirrors are often provided as displays. There is a possibility that the display system 1 of the present disclosure can be applied to a case where additional information such as guide information is superimposed. Basically, one driver is assumed to be a user of the display system 1.

(A) Work Start Timing

For safety, the detection of the gaze line ES is constantly performed from the moment when the user US starts driving. The superimposition of the display object DI is started when the sensor unit 40 attached to the rearview mirror acquires the gaze line ES of the user US. In a case of sensing danger, for example, even in a case where the gaze line ES of the user US deviates, it is also possible to display to perform gaze line guidance. The example of FIG. 21 uses an arrow to indicate an approaching vehicle to notify the user US of the danger.

(B) Detecting Gaze Line

Since it is assumed that the display system 1 is used during driving, it is necessary to avoid display that makes the user US feel uncomfortable, for example, the display that is out of focus from the user US. Therefore, it is necessary to calculate the gaze point GP of the user US by constantly detecting the gaze line ES to be able to handle a minute change.

(C) Depth Detection Timing

When the user US looks at the rearview mirror during driving, it is considered that the user US looks at the rearview mirror with a purpose. Therefore, when the gaze line ES of the user US is detected, the depth distance is immediately detected. For example, the visual field range VA, as a whole, of the user US via the half mirror 21 is set as the gaze target region, and a depth map of the gaze target region is detected in advance. Since the depth distance of the gaze point GP is quickly detected based on the depth map, it is possible to perform control without delay.

(D) Optical Control

Since downsizing is required, it is conceivable to use an optical control system as illustrated in FIG. 3 or 10.

(E) Work End Timing

For example, in a case where the gaze line ES deviates from the rearview mirror for a certain period of time or more, the data processing unit 11 can stop presenting the display object DI. Furthermore, in a case where the user US finishes driving, the gaze line detection can be finished.

9. Effects

The processing unit 10 includes the gaze point calculation unit 51, the depth calculation unit 52, the display generation unit 53, and the drive calculation unit 55. The gaze point calculation unit 51 calculates the gaze point GP on the virtual image VI reflected on the half mirror 21. The depth calculation unit 52 generates depth information related to the depth of the gaze point GP. The display generation unit 53 generates a display object DI to be superimposed on the virtual image VI. The drive calculation unit 55 drives the superimposition optical system 30 of the display object DI so as to allow the display object DI to be observed as an image having a depth corresponding to the depth information. The information processing method of the present embodiment including execution of processing of the processing unit 10 described above by a computer. The program of the present embodiment causes the computer to implement the processing of the processing unit 10 described above.

With this configuration, the position in the depth direction at which the display object DI is presented is easily adjusted based on the gaze point GP.

The drive calculation unit 55 calculates the drive amount of the superimposition optical system 30 based on the relative position between the eye EY of the user US and the gaze point GP.

With this configuration, the display object DI is appropriately superimposed based on the gaze line direction of the user US. Therefore, even with a change in the angle of looking into the half mirror 21, it is unlikely to have a situation in which the gaze line ES is directed to the outside of the angle of view of the display 22 and the display object DI fails to be superimposed on the gazed region.

The drive calculation unit 55 controls the optical arrangement and optical characteristics of the lens unit 31 and the full mirror 33 included in the superimposition optical system 30 to adjust the position in the depth direction at which the display object DI is observed. Alternatively, the drive calculation unit 55 adjusts the position in the depth direction at which the display object DI is observed by controlling the focal length of the variable focus lens AF included in the superimposition optical system 30.

With this configuration, the presentation position of the display object DI is adjusted with high accuracy.

The drive calculation unit 55 adjusts the position in the depth direction at which the display object DI is observed by controlling, for each region, the phase modulation amount of the phase modulation element PM included in the superimposition optical system 30.

This configuration makes it possible to electrically generate any luminosity distribution. Therefore, the focused display objects DI can be simultaneously presented at a plurality of positions having mutually different depths.

The processing unit 10 includes a means of canceling a change in the display magnification of the display object DI accompanying the driving of the superimposition optical system 30. For example, the display generation unit 53 adjusts the size of the display object DI so as to cancel the change in the display magnification of the display object DI accompanying the driving of the superimposition optical system 30. Alternatively, the drive calculation unit 55 adjusts the size of the display object DI by the beam expander so as to cancel the change in the display magnification of the display object DI accompanying the driving of the superimposition optical system 30.

With this configuration, the size of the display object DI observed by the user US is unlikely to vary due to the movement of the gaze point GP.

The depth calculation unit 52 generates depth information based on the distance in the depth direction from the half mirror 21 to the corresponding point CP on the real image RI corresponding to the gaze point GP.

This configuration eliminates the necessity to have a special distance measuring means for measuring the distance to the virtual image VI. The depth information is easily calculated using a known distance measuring method of measuring the distance of the real image RI, such as ToF.

The depth calculation unit 52 determines the generation timing and the generation range of the depth information based on the status in which the gaze is performed.

This configuration makes it possible to generate the depth information can at appropriate timing and in an appropriate range according to the status.

The depth calculation unit 52 generates a depth map indicating the depth distribution of the virtual image VI. The drive calculation unit 55 controls the drive of the superimposition optical system 30 based on the depth information of the gaze point GP extracted from the depth map.

This configuration, the depth information is quickly acquired using the depth map. This reduces the delay from the movement of the gaze point GP to the focus of the display object DI.

The depth calculation unit 52 sets, among the virtual images VI reflected on the half mirror 21, a virtual image VI in a specific range according to the status where gaze is performed, as a gaze target region $VI_{PA}$. The depth calculation unit 52 selectively generates a depth map for the gaze target region $VI_{PA}$.

With this configuration, the generation range of the depth map is restricted. This makes it possible to reduce the processing required for generating the depth map.

When the gaze point GP temporarily deviates from the gaze target region $VI_{PA}$, the depth calculation unit 52 stops generation of the depth map.

This configuration makes it possible suppress unnecessary continuation of generation of the depth map.

The depth calculation unit 52 adopts, as the depth information, depth information before the gaze point GP deviates from the gaze target region $VI_{PA}$ or default depth information.

This configuration suppresses unnecessary calculation of the depth information due to the temporary deviation of the gaze line ES.

The display generation unit 53 stops the output of the display object DI during a period in which the gaze point GP deviates from the gaze target region $VI_{PA}$.

This configuration suppresses a situation in which the display object DI is presented at a position deviated from the intended position due to the temporary deviation of the gaze line ES.

The display generation unit 53 temporarily hides or greys out the display of the display object DI in the delay period occurring during the period from the movement of the gaze point GP to the adjustment of the superimposition optical system 30.

This configuration makes it possible for the user US to less likely to feel the delay.

The display generation unit 53 notifies that the presentation position of the display object DI is being adjusted in the delay period generated from the movement of the gaze point GP to the adjustment of the superimposition optical system 30.

This configuration makes it possible for the user US to less likely to feel the delay.

The display generation unit 53 gradually changes the observed position of the display object DI within the delay period generated from the movement of the gaze point GP to the adjustment of the superimposition optical system 30.

This configuration makes it possible for the user US to less likely to feel the delay.

The depth calculation unit 52 generates, as preliminary information, depth information of one or more predicted gaze points, which are points at which gaze is predicted. The drive calculation unit 55 extracts, from the preliminary information, depth information of the predicted gaze point that matches the gaze point GP. The drive calculation unit 55 controls driving of the superimposition optical system 30 based on the extracted depth information.

With this configuration, the depth information is quickly acquired using the preliminary information. This reduces the delay from the movement of the gaze point GP to the focus of the display object DI.

The depth calculation unit 52 generates calibration information based on the deviation of the presentation position of the display object DI.

With this configuration, the presentation position of the display object DI is appropriately adjusted by calibration.

When the gaze line ES is detectable, the gaze point calculation unit 51 calculates the gaze point GP based on the gaze line ES. When the gaze line ES is not detectable, the gaze point calculation unit 51 calculates the gaze point GP based on indirect information suggesting the gaze line ES.

With this configuration, even when the gaze line ES cannot be detected, the presentation position of the display object DI can be adjusted.

When the gaze point calculation unit 51 cannot detect the gaze line ES, the gaze point calculation unit notifies the user US.

With this configuration, even when a problem occurs in the display of the display object DI, the user US is less likely to feel uncomfortable.

When the gaze point GP has been detected at a boundary between two virtual image regions having different depth directions, the display generation unit 53 first generates a display object DI to be superimposed on one virtual image region. The drive calculation unit 55 drives the superimposition optical system 30 based on the depth information of the one virtual image region. The gaze point calculation unit 51 calculates the gaze point GP of the user US observing the display object DI presented as an image having a depth corresponding to the depth information of one virtual image region. When the gaze point GP has moved to the other virtual image region, the drive calculation unit 55 drives the superimposition optical system 30 based on the depth information of the other virtual image region. The display generation unit 53 gradually changes the observed position of the display object DI within a period in which the adjustment of the superimposition optical system 30 is performed based on the depth information of the other virtual image region.

This this configuration, the gaze point GP is detected with high accuracy based on the gaze line guidance.

The effects described in the present specification are merely examples, and thus there may be other effects, not limited to the exemplified effects.

Supplementary Notes

Note that the present technique can also have the following configurations.

(1)

An information processing device comprising:
a gaze point calculation unit that calculates a gaze point on a virtual image reflected on a half mirror;
a depth calculation unit that generates depth information related to a depth of the gaze point;
a display generation unit that generates a display object to be superimposed on the virtual image; and
a drive calculation unit that drives a superimposition optical system of the display object so as to allow the display object to be observed as an image having a depth according to the depth information.

(2)

The information processing device according to (1),
wherein the drive calculation unit calculates a drive amount of the superimposition optical system based on a relative position between a user's eye and the gaze point.

(3)

The information processing device according to (1) or (2),
in which the drive calculation unit controls optical arrangement and optical characteristics of a lens unit and a full mirror included in the superimposition optical system so as to adjust a position in a depth direction in which the display object is observed.

(4)

The information processing device according to (1) or (2),
in which the drive calculation unit controls a focal length of a variable focus lens included in the superimposition optical system so as to adjust a position in a depth direction in which the display object is observed.

(5)

The information processing device according to (1) or (2),
in which the drive calculation unit controls, for each region, a phase modulation amount of a phase modulation element included in the superimposition optical system so as to adjust a position in a depth direction in which the display object is observed.

(6)

The information processing device according to any one of (1) to (5), further including
a means of canceling a change in display magnification of the display object accompanying driving of the superimposition optical system.

(7)

The information processing device according to (6),
in which the display generation unit adjusts size of the display object so as to cancel the change in the display magnification of the display object accompanying the driving of the superimposition optical system.

(8)

The information processing device according to (6),
in which the drive calculation unit adjusts size of the display object by a beam expander so as to cancel the change in display magnification of the display object accompanying the driving of the superimposition optical system.

(9)

The information processing device according to any one of (1) to (8),
wherein the depth calculation unit generates the depth information based on a distance in a depth direction from the half mirror to a corresponding point on a real image corresponding to the gaze point.

(10)

The information processing device according to any one of (1) to (9),
wherein the depth calculation unit determines a generation timing and a generation range of the depth information based on a status in which gaze is performed.

(11)

The information processing device according to (10),
wherein the depth calculation unit generates a depth map indicating a depth distribution of the virtual image, and
the drive calculation unit controls driving of the superimposition optical system based on the depth information of the gaze point extracted from the depth map.

(12)

The information processing device according to (11),
wherein the depth calculation unit sets the virtual image in a specific range according to the status among the virtual images reflected on the half mirror as a gaze target region, and selectively generates the depth map for the gaze target region.

(13)
The information processing device according to (12), wherein the depth calculation unit stops generation of the depth map when the gaze point deviates from the gaze target region.

(14)
The information processing device according to (13), wherein the depth calculation unit adopts, as the depth information, the depth information before the gaze point deviates from the gaze target region or default depth information being the depth information set as a default.

(15)
The information processing device according to (13) or (14),
wherein the display generation unit stops output of the display object during a period in which the gaze point deviates from the gaze target region.

(16)
The information processing device according to (10), wherein the display generation unit temporarily hides display of the display object or greys out the display in a delay period occurring during a period from movement of the gaze point to adjustment of the superimposition optical system.

(17)
The information processing device according to (10), wherein the display generation unit notifies that a presentation position of the display object is being adjusted in a delay period occurring during a period from the movement of the gaze point to adjustment of the superimposition optical system.

(18)
The information processing device according to (10), wherein the display generation unit gradually changes an observed position of the display object within a delay period occurring during a period from movement of the gaze point to adjustment of the superimposition optical system.

(19)
The information processing device according to (10), wherein the depth calculation unit generates the depth information of one or more predicted gaze points, which are points at which gaze is predicted, as preliminary information, and
the drive calculation unit extracts the depth information of a predicted gaze point matching the gaze point from the preliminary information, and controls driving of the superimposition optical system based on the extracted depth information.

(20)
The information processing device according to any one of (1) to (19),
wherein the depth calculation unit generates calibration information based on deviation of a presentation position of the display object.

(21)
The information processing device according to any one of (1) to (20),
wherein the gaze point calculation unit calculates the gaze point based on the gaze line in a case where the gaze line is detectable, and calculates the gaze point based on indirect information suggesting the gaze line in a case where the gaze line is not detectable.

(22)
The information processing device according to (21), wherein the gaze point calculation unit notifies a user when the gaze line cannot be detected.

(23)
The information processing device according to any one of (1) to (22),
wherein, in a case where the gaze point has been detected at a boundary between two virtual image regions having mutually different depth directions,
the display generation unit generates the display object to be superimposed on one virtual image region,
the drive calculation unit drives the superimposition optical system based on the depth information of the one virtual image region,
the gaze point calculation unit calculates the gaze point of a user observing the display object presented as an image having a depth corresponding to the depth information of the one virtual image region,
the drive calculation unit drives the superimposition optical system based on the depth information of the other virtual image region when the gaze point moves to the other virtual image region, and
the display generation unit gradually changes an observed position of the display object within a period in which adjustment of the superimposition optical system is performed based on the depth information of the other virtual image region.

(24)
An information processing method executed by a computer, the method comprising:
calculating a gaze point on a virtual image reflected on a half mirror;
generating depth information related to a depth of the gaze point;
generating a display object to be superimposed on the virtual image; and
driving a superimposition optical system of the display object so as to allow the display object to be observed as an image having a depth according to the depth information.

(25)
A program causing a computer to implement the following processes:
calculating a gaze point on a virtual image reflected on a half mirror;
generating depth information related to a depth of the gaze point;
generating a display object to be superimposed on the virtual image; and
driving a superimposition optical system of the display object so as to allow the display object to be observed as an image having a depth according to the depth information.

REFERENCE SIGNS LIST

10 PROCESSING UNIT (INFORMATION PROCESSING DEVICE)
21 HALF MIRROR
30 SUPERIMPOSITION OPTICAL SYSTEM
31 LENS UNIT
33 FULL MIRROR
51 GAZE POINT CALCULATION UNIT
52 DEPTH CALCULATION UNIT
53 DISPLAY GENERATION UNIT
55 DRIVE CALCULATION UNIT

AF VARIABLE FOCUS LENS
DI DISPLAY OBJECT
ES GAZE LINE
EY USER'S EYE
GP GAZE POINT
PM PHASE MODULATION ELEMENT
US USER
VI VIRTUAL IMAGE
$VI_{PA}$ GAZE TARGET REGION

The invention claimed is:

1. An information processing device, comprising:
a processor configured to:
  calculate a gaze point of a user on a virtual image reflected on a half mirror;
  generate depth information related to a depth of the gaze point;
  generate a display object superimposable on the virtual image;
  control a driving operation of a superimposition optical system of the display object such that the display object is observable as an image having a depth corresponding to the depth information; and
  cancel a change in a display magnification of the display object,
    wherein the change in the display magnification of the display object is based on the driving operation of the superimposition optical system.

2. The information processing device according to claim 1, wherein the processor is further configured to calculate a drive amount of the superimposition optical system based on a relative position between an eye of the user and the gaze point.

3. The information processing device according to claim 1, wherein the processor is further configured to generate the depth information based on a distance in a depth direction from the half mirror to a corresponding point on a real image corresponding to the gaze point.

4. The information processing device according to claim 1, wherein the processor is further configured to determine a generation timing and a generation range of the depth information based on a gaze of the user.

5. The information processing device according to claim 4, wherein the processor is further configured to:
  generate a depth map indicating a depth distribution of the virtual image; and
  control the driving operation of the superimposition optical system based on the depth information of the gaze point extracted from the depth map.

6. The information processing device according to claim 5, wherein the processor is further configured to:
  set the virtual image among virtual images reflected on the half mirror as a gaze target region; and
  selectively generate the depth map for the gaze target region.

7. The information processing device according to claim 6, wherein the processor is further configured to stop the generation of the depth map in a case where the gaze point deviates from the gaze target region.

8. The information processing device according to claim 7, wherein the processor is further configured to adopt, as the depth information, one of the depth information before the gaze point deviates from the gaze target region or default depth information.

9. The information processing device according to claim 7, wherein the processor is further configured to stop output of the display object in a period in which the gaze point deviates from the gaze target region.

10. The information processing device according to claim 4, wherein
  the processor is further configured to one of temporarily hide display of the display object or grey out the display of the display object in a delay period, and
  the delay period is in a period from movement of the gaze point to adjustment of the superimposition optical system.

11. The information processing device according to claim 4, wherein
  the processor is further configured to notify that a presentation position of the display object is adjusted in a delay period, and
  the delay period is in a period from movement of the gaze point to adjustment of the superimposition optical system.

12. The information processing device according to claim 4, wherein
  the processor is further configured to gradually change an observed position of the display object within a delay period, and
  the delay period is in a period from movement of the gaze point to adjustment of the superimposition optical system.

13. The information processing device according to claim 4, wherein the processor is further configured to:
  generate the depth information of one or more predicted gaze points, which are points at which the gaze is predicted, as preliminary information;
  extract, from the preliminary information, the depth information of a predicted gaze point of the one or more predicted gaze points that matches the gaze point; and
  control the driving operation of the superimposition optical system based on the extracted depth information.

14. The information processing device according to claim 1, wherein the processor is further configured to generate calibration information based on a deviation of a presentation position of the display object.

15. The information processing device according to claim 1, wherein the processor is further configured to:
  calculate the gaze point based on a gaze line of the user in a case where the gaze line is detectable; and
  calculate, in a case where the gaze line is not detectable, the gaze point based on indirect information indicating the gaze line.

16. The information processing device according to claim 15, wherein the processor is further configured to notify the user in the case where the gaze line is not detectable.

17. The information processing device according to claim 1, wherein the processor is further configured to:
  detect the gaze point at a boundary between a first virtual image region and a second virtual image region,
    wherein the first virtual image region and the second virtual image region have mutually different depth directions;
  generate the display object superimposable on the first virtual image region;
  control the driving operation of the superimposition optical system based on the depth information of the first virtual image region;
  calculate the gaze point of the user that observes the display object,
    wherein the display object is observable as the image having the depth corresponding to the depth information of the first virtual image region;
  control the driving operation of the superimposition optical system based on the depth information of the second virtual image region in a case where the gaze point moves to the second virtual image region; and gradually change an observed position of the display object within a period of adjustment of the superimposition optical system, wherein the adjustment of the superimposition optical system is based on the depth information of the second virtual image region.

18. An information processing method executed by a computer, the information processing method comprising:

calculating a gaze point of a user on a virtual image reflected on a half mirror;

generating depth information related to a depth of the gaze point;

generating a display object superimposable on the virtual image;

driving a superimposition optical system of the display object such that the display object is observable as an image having a depth corresponding to the depth information; and canceling a change in a display magnification of the display object, wherein the change in the display magnification of the display object is based on the driving of the superimposition optical system.

19. A non-transitory computer-readable medium having stored thereon, computer-executable instructions which, when executed by a computer, cause the computer to execute operations, the operations comprising:

calculating a gaze point of a user on a virtual image reflected on a half mirror;

generating depth information related to a depth of the gaze point;

generating a display object superimposable on the virtual image;

driving a superimposition optical system of the display object such that the display object is observable as an image having a depth corresponding to the depth information; and canceling a change in a display magnification of the display object, wherein the change in the display magnification of the display object is based on the driving of the superimposition optical system.

* * * * *